(12) United States Patent
Anupam

(10) Patent No.: US 8,705,712 B2
(45) Date of Patent: Apr. 22, 2014

(54) SYSTEM AND METHOD FOR DELIVERING CONTENT TO A USER OF A TELEPHONY DEVICE

(75) Inventor: Vinod Anupam, Bridgewater, NJ (US)

(73) Assignee: Anexas, Inc., Bridgewater, NJ (US)

( * ) Notice: Subject to any disclaimer, the term of this patent is extended or adjusted under 35 U.S.C. 154(b) by 660 days.

(21) Appl. No.: 12/595,168

(22) PCT Filed: Apr. 11, 2008

(86) PCT No.: PCT/US2008/060048
§ 371 (c)(1),
(2), (4) Date: Mar. 26, 2010

(87) PCT Pub. No.: WO2008/128053
PCT Pub. Date: Oct. 23, 2008

(65) Prior Publication Data
US 2010/0208874 A1    Aug. 19, 2010

Related U.S. Application Data

(60) Provisional application No. 60/922,880, filed on Apr. 11, 2007.

(51) Int. Cl.
*H04M 1/64* (2006.01)
(52) U.S. Cl.
USPC ..................................................... 379/88.22
(58) Field of Classification Search
USPC .......... 379/88.01–211.02; 726/2–17; 709/229
See application file for complete search history.

(56) References Cited

U.S. PATENT DOCUMENTS

| 5,774,674 A | 6/1998 | Gutmann et al. |
| 8,056,120 B2 * | 11/2011 | Kusakari ........................... 726/2 |
| 2006/0160521 A1 | 7/2006 | Foucher |
| 2006/0161667 A1 * | 7/2006 | Umesawa et al. ............. 709/229 |
| 2008/0205617 A1 * | 8/2008 | Sugawara et al. ........ 379/211.02 |
| 2008/0307514 A1 * | 12/2008 | Kusakari ........................... 726/7 |
| 2009/0202058 A1 | 8/2009 | Khan |

FOREIGN PATENT DOCUMENTS

| WO | 2007001197 | 1/2007 |
| WO | 2009098665 | 8/2009 |

OTHER PUBLICATIONS

International Search Report of PCT/US2008/060048 dated Aug. 1, 2008.
European Search Report for Application No. 08745617.4 issued Feb. 7, 2013.

* cited by examiner

*Primary Examiner* — Mohammad Islam
(74) *Attorney, Agent, or Firm* — Lowenstein Sandler LLP

(57) ABSTRACT

A system and method for utilizing information exchanged during an initiation phase (i.e., the "ringing" phase) of a conventional telephone connection request received from a telephony device, in order to identify and provide a user with content or enhanced services. In a convention telephone call the connection request includes information that identifies the user and/or telephony device that placed the phone call (the originating number) and the dialed phone number (the signaling number). The connection request is rejected and the call is terminated Prior to termination of the call the originating dumber and/or signaling number are extracted and used to identify a task that is desired by a user; content associated with the task is delivered to the user.

27 Claims, 12 Drawing Sheets

SYSTEM AND METHOD FOR DELIVERING CONTENT TO A USER OF A TELEPHONY DEVICE

CROSS REFERENCE TO RELATED APPLICATIONS

This application is a U.S. National Stage Application of PCT International Application No. PCT/US2008/060048, titled "System and Method for Delivering Content to a User of a Telephony Device", filed Apr. 11, 2008, which in turn claims the benefit of U.S. Provisional Application No. 60/922,880, filed Apr. 11, 2007. The entire disclosures of PCT International Application No. PCT/US2008/060048 and U.S. Provisional Application No. 60/922,880 are hereby incorporated by reference herein.

BACKGROUND OF THE INVENTION

1. Field of the Invention

The present invention relates to the utilization of a telephony device to trigger a given event. More specifically, the present invention relates to a system and method for utilizing the information exchanged during the initialization of a telephony connection request to effectuate the execution of a desired task.

2. Description of the Prior Art

Many telecommunication networks were originally built to transmit voice traffic from a first fixed point to a second fixed point. Advances in technology now provide users the ability to utilize telecommunication networks to transmit voice, data, and video from one mobile device to one or more mobile devices.

Despite these advances, most users continue to pay usage charges for many functions performed using a telephony device. Whether it be a per minute connection charge or a flat rate unlimited data fee, most users pay fees to perform nearly all functions of the modern telecommunication network. However, in order for a telephony connection to be initiated a small amount of data must be transmitted from the originating source to the destination. This information, in the form of a call request, is often transmitted by a telephone service provider free of charge. This call request often comprises information such as the originating telephony device identification and destination node identification.

Despite the fact that most telephone service providers transmit call request information without subjecting users to traditional usage charge, the prior art lacks a method and system for utilizing this call request information in order to provide enhanced functionality to telephony users.

SUMMARY OF THE INVENTION

The present invention relates to a system and method for utilizing the information exchanged during the initiation phase of a conventional telephone connection request in order to identify and provide users with enhanced services. According to an embodiment of the present invention, a content delivery system and methods are enabled to receive a connection request from a telephony device. As with a conventionally placed telephone call, the connection request includes information that identifies the user and/or telephony device, that placed the phone call (the originating number) and the dialed phone number the signaling number).

During the initiation phase (i.e., the period wherein the connection request is transmitted by the telephony device and prior to establishment of the requested connection), the content delivery system extracts information related to the connection request, and "rejects" the connection request (i.e., actively rejects the connection request or passively allows the telephony device to cancel the request). As a result, no connection is established.

The extracted information (i.e., the originating number, the signaling number, or both) is associated with and identifies one or more tasks to be executed (the desired task(s)). The content delivery system utilizes the connection request information to identify the one or more desired tasks and delivers content associated with the desired task(s) to the user.

According to embodiments of the present invention, the connection request transmitted by the telephony device operates as a request for the execution of a desired task. Advantageously, by extracting the connection request information and terminating/rejecting the connection request during the initiation phase of the call (i.e., prior to completion of the call), no usage charge is assessed to the account of the initiating telephony device. In this regard, the user may dial a particular signaling number in order to submit a request for the completion of a desired task, the connection request is terminated/rejected, the desired task is identified and the content associated with the desired task is delivered to the user according to one or more delivery methods of the present invention (i.e., an electronic mail, a post office mailing, a web posting, a telephonic communication, a short message service (SMS) message, a Wireless Application Protocol (WAP) push, etc.).

According to an embodiment of the present invention, the methods and systems allow a user to leverage the "free" or "no cost" portion associated with a conventional request to establish a telephone connection (i.e., the initiation phase during which a call is placed but terminated prior to completion) by providing the user with the ability to submit a request for the execution of a desired task. In response to the submission of the desired task request, the systems and methods of the present invention provide the user with the content associated with the desired task.

BRIEF DESCRIPTION OF THE FIGURES

The above and other objects and advantages of the present invention will become apparent upon consideration of the following detailed description, taken in conjunction with the accompanying drawings, in which like reference characters refer to like pads throughout and which.

It is to be understood that the attached drawings are for purposes of illustrating the concepts of the invention and may not be to scale.

DETAILED DESCRIPTION OF THE FIGURES

The present invention relates to a method and a system for delivering content to or on behalf of a user of a telephony device (herein referred to as the Content Delivery System 100). The "user" includes any person, system, machine, computer, and/or network that utilizes and/or causes a telephony device to access, connect to, communicate with, and/or interact with the content delivery system of the present invention. The "Telephony Device" includes any communications device, machine, system, computer, etc., configured to initiate and/or establish a telephone connection via a conventional telecommunications network. One having ordinary skill in the art will appreciate that the telephony device may be a wireless communications device or a wired communications device (i.e., a land-line unit). Exemplary telephony devices suitable for use in accordance with the present invention include, but are not limited to, a conventional land-line telephone and mobile phone (i.e., a cell phone) One having ordinary skill in the art will further appreciate that the telecommunications network may be a wireless network, a wired network, a Voice Over Internet Protocol (VOIP) network, or a combination thereof.

Figure 1:
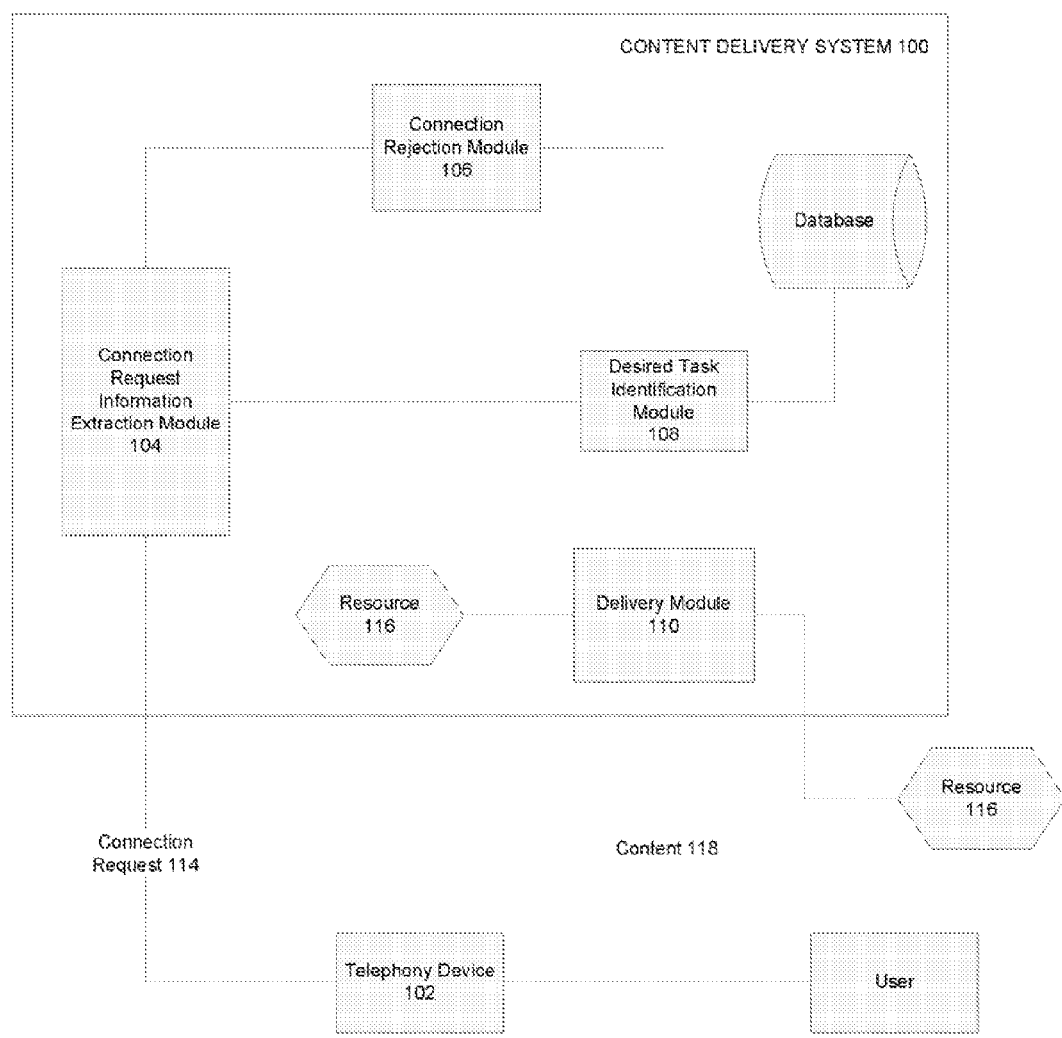
FIG. 1 illustrates an exemplary network environment including a content delivery system, according to an embodiment of the present invention.

FIG. 1 depicts an exemplary Content Delivery System 100 according to the present invention communicatively connected to a Telephony Device 102 via a telecommunication network. It should be noted that the network illustrated in FIG. 1 is provided to assist in demonstrating the novel aspects of the present invention and is not presented for purpose of limitation.

The Content Delivery System 100 is a computer-based system, accessible by one or more Telephony Devices 102, which includes but is not limited to the following components: a Connection Request Information Extraction Module (CRIEM) 104, a Connection Rejection Module (CRM) 106, a Desired Task identification Module (DTIM) 108, and a Delivery Module (DM) 110. The term "computer" or "computing device" is intended to include any data processing device, such as a desktop computer, a laptop computer, a mainframe computer, a personal digital assistant, a server, a handheld device, or any other device able to process data.

One having ordinary skill in the art will appreciate that the components of the Content Delivery System 100 may be located on a single computer, as shown in FIG. 1, or on more than one communicatively connected computers. Furthermore, each of the components of the Content Delivery System 100 may be comprised of one or more computer-executable software application(s) in combination with one or more computing devices. The term "communicatively connected" is intended to include any type of connection, whether wired or wireless, in which data may be communicated. The term "communicatively connected" is intended to include a connection between devices and/or programs within a single computer or between devices and/or programs on separate computers.

Although FIG. 1 illustrates the components of the Content Delivery System 100 as separate modules, one having ordinary skill in the art will appreciate that the modules (104-110) may be combined and/or integrated on one or more devices.

Figure 2:
FIG. 2 illustrates an exemplary process for delivering content to or on behalf of a user, according to an embodiment of the present invention.

The Content Delivery System 100 and modules 104-110 thereof are described herein with reference FIGS. 1 and 2. According to an embodiment of the present invention, a user seeking the performance of a "desired task" utilizes a Telephony Device 102 to generate a "connection request" 114. The term "desired task" is intended to include, but is not limited to, one or more jobs, events, requests for information, operations, and activities that the user wishes to have performed, executed, implemented, or acted on. The performance of the desired task results in the delivery of content to or on behalf of the user, as described in detail below. Exemplary desired tasks include, but are not limited to: 1) the request for the return of any information, such as flight status or sports scores; 2) the placement of a purchase order; 3) the initiation of an interactive game; 4) the activation of a system (e.g., a security system or operation of an automatic garage door system); and 5) the updating of data in a database or on a Website; etc.

The term "connection request" is intended to include, but is not limited to, a request to establish a telephone connection with a destination resource (i.e., a destination telephony device). The connection request 114 transmitted by the Telephony Device 102 comprises "connection request information", including but not limited to, an "originating number" and a "signaling number." The term "originating number" is intended to include, but is not limited to, a telephone number associated with and capable of identifying the telephony device and/or the user that submitted the connection request 114. The term "signaling number" is intended to include, but is not limited to a telephone number associated with and capable of identifying one or more desired tasks.

One having ordinary skill in the art will appreciate that the originating numbers and the signaling numbers may be comprised of any arrangement of numeric, alphabet characters, and/or symbols (e.g., # and *) suitable for use in a conventional telephone communications network.

As shown in FIGS. 1 and 2, in step 202, the connection request 114 is transmitted by the Telephony Device 102 and received by the Connection Request Information Extraction Module 104. In step 204, the Connection Request information Extraction Module 104 extracts at least a portion of the connection request information from the connection request. The extracted connection request information, which may be all or a portion of the connection request information, is communicated by the Connection Request Information Extraction Module 104 to the Desired Task identification Module 110 for performance of step 208, described below. One having ordinary skill in the art will appreciate that the extracted information may be provided directly to the Desired Task identification Module 110 or via the Connection Rejection Module 108, as shown in FIG. 1.

One having ordinary skill in the art will appreciate that the Connection Request Information Extraction Module 104 may be configured to perform the extraction according to known methods and systems suitable for use in accordance with the present invention, including but not limited to the use of an Automatic Number Identification method/system (ANI) (i.e., for extraction of the originating number) and/or a Dialed Number identification Service (DNIS) for extraction of the signaling number).

In step 206, the Connection Rejection Module 108 receives and "rejects" the connection request 114. One having ordinary skill in the art will appreciate that the connection request 114 may be rejected according to any suitable method and/or system known in the art. For example, if the Connection Rejection Module 106 is executing a Session Initiation Protocol (SIP), the Connection Rejection Module 106 may reject the connection request 114 by transmitting a BUSY message through the use of SIP. Alternatively, the Connection Rejection Module 106 may passively reject the connection request 114 by simply not seizing or recognizing the connection request 114. By not seizing the connection request 114, the user may be presented with continuous "ringing," thereby providing the user with a cue that the connection will not be connected. Accordingly, the user may take the necessary steps to terminate the connection request 114.

By rejecting the connection request 114, the Connection Rejection Module 108 terminates the call initiated by the Telephony Device 102. As a result, no telephone connection is established between the originating number (the Telephony Device 102) and the signaling number. One having ordinary skill in the art will appreciate that step 204 and step 206 may be performed in any order relative to one another, and may be performed in series or in parallel with one another.

The time period from transmission of the connection request by the telephony device (i.e., placement of the call) to rejection of request in step 206 is referred to as the "initiation phase" of the call. Advantageously, in conventional telephone systems, telephone service providers typically provide the initiation phase of a call at no charge. This "free" period is leveraged by the systems and methods of the present invention, in that a request for the execution of a desired task may be submitted by a user free of charge. Accordingly, given that the connection request 114 is rejected prior to establishment of the call, in most cases, the Telephony Device 102 that initiated the connection request is not charged a usage fee for submitting the desired task.

Following, or in parallel with, the rejection of the call request at step 206, the identity of the desired task is determined by the Desired Task Identification Module 110, at step 208. The Desired Task Identification Module 110 identifies the desired task based the extracted connection request information. According to an embodiment of the present invention, the Desired Task Identification Module 110 is communicatively connected to a database configured to store information relating to the identity of a desired task, such as, for example, a plurality of "profiles" and "associations", described below.

According to an embodiment of the present invention, a "profile" may be established and stored in the database which links one or more desired tasks to a particular user and/or Telephony Device 102. An "association" may be established and stored in the database which links or relates one or more desired tasks to an originating number, a signaling number, and/or a combination of both.

For example, a user, referred to as John Doe, may establish a "profile" which provides that when he submits a connection request from either of his Telephony Devices 102: 1) his mobile phone (originating number (123 555-1234) and/or 2) his home phone (originating number 123-555-1234) to any of the signaling numbers associated with the Content Delivery System 100 of the present invention, he wishes to have the current price of ten pre-selected stocks (herein the "John Doe, portfolio") sent to him via an electronic mail communication. Upon extraction of originating number 123-555-1234 from a connection request 114, the Desired Task Identification Module 110 links said number to the John Doe profile and identifies the desired task associated with that profile (i.e., return the current stock price for the John Doe portfolio).

According to an embodiment of the present invention, the Desired Task identification Module 110 may be configured to identify the one or more desired tasks through the use of a hash table, or like data structure, wherein the hash table is configured to store profiles, associations, or other information associated with the identity of a desired task.

With reference to Table 1 below, the following section provides a number of examples of the identification of the desired task based on the extracted connect request information. In these examples, the originating number and the signaling number are expressed according to the following standard convention: (Area. Code) Prefix-Line Number. As shown in Table 1, three separate connection requests (Connection Request Nos. 1-3) are received by the Connection Request. Information Extraction Module 104 of the present invention. For Connection Request No. 1, the Connection Request Information Extraction Module 104 extracts the time of the call [3:00:00], the originating number [(999) 555-1234)] and the signaling number [(999) 555-4321)]. Using the extracted information, the Connection Request Information Extraction Module 104 queries the database, determines the associations related to the combination of the extracted originating number and the extracted signaling number, and identifies the desired task(s) (i.e., return of the current time and temperature in Newark, N.J.).

In the second example, the Connection Request Information Extraction Module 104 extracts the time of the call (3:00:30) and the signaling number [(999) ABC-4444)]. In this example, the signaling number [(999) ABC-4444] is associated with a particular desired task, which enables the Desired Task Identification Module 110 to determine that the user is seeking the current flight status of ABC Airline Flight Number 4444. As demonstrated by this example, the numbers comprising the signaling number may be selected in a manner in which the numbers themselves have a logical relationship to the underlying task. As shown here, the "prefix" portion of the signaling number "ABC" represents the name of the airline and the "line number" portion of the signaling number represents the flight number.

In the third example, the Connection Request Information Extraction Module 104 extracts the tune of the call (3:01 00) the originating number [(900) 555-7777] and the signaling number [(999) 555 8888]. In this example, the Desired Task identification Module 110 identifies a profile related to the originating number, wherein the profile indicates that a connection request transmitted with this particular originating number to this particular signaling number relates to a desired task defined as the return of the current sports scores for all professional teams within a certain geographic radius of the territory covered by area code "900". Advantageously, the profile may be pre-established by a user to define any number and type of desired tasks to be triggered by the one or more originating numbers controlled by that user.

TABLE 1

| Connection Request No. | Time of Call | Extracted Connection Request Information | | Desired Task(s) |
|---|---|---|---|---|
| | | Originating Number | Signaling Number | |
| 1 | 03:00:00 | (999) 555-1234 | (999) 555-4321 | Return current time and temperature in Newark, New Jersey |
| 2 | 03:00:30 | N/A | (999) ABC-4444 | Return current status of ABC Airlines Flight 4444 |
| 3 | 03:01:00 | (900) 555-7777 | (999) 555-8888 | Return sports score update for most local sports team in geographic proximity to area code (900) |

Following identification of the one or more desired tasks, in step 210, the Delivery Module 112 generates, retrieves, obtains, accesses, and/or determines the "content" 118 associated with the desired task and delivers the content 118 to the user. The "content" may include, but is not limited to, any information that is associated with the desired task. With reference to the first example described above in regard to Table 1, the content associated with the desired task is the temperature reading for Newark, N.J. at the time and date the connection request is received.

According to an embodiment of the present invention, the Delivery Module 112 may be communicatively connected to one or more Resources 116 configured to store, generate, serve, transmit, supply or provide the content 118 associated with the desired task to the Delivery Module 112. Exemplary Resources 116 suitable for use in accordance with the present invention include any known provider of information (both electronic-based and otherwise), such as, websites, databases, computer-readable media, books, etc. One having ordinary skill in the art will appreciate that the Delivery Module 112 may deliver the content 118 to the user in any suitable method, modes, systems, or processes of communications, including but not limited to, electronic mail, web-based posting or other web-based communication (collectively, an "Internet-based communication"), a short message service (SMS) communication, a text message communication, a postal mail communication, personal delivery, and a return telephone communication. It is further noted that the content 118 need not necessarily be delivered to the Telephony Device 102 from which the connection request 114 originated. Instead, the content 118 may be delivered directly to: 1) the user (e.g., the delivery of a food (the content) to the user's home address); 2) any device other than the Telephony Device 102 that transmitted the connection request 114, including a device associated, with the user the user's electronic mail address); and for 3) a deuce associated with another user (e.g., a phone of a "buddy" of the ser). Delivery locations such as the user's address information, associated device information, and the user's "buddy" information may be stored as part of the user's profile.

With reference to the second example described above in regard to Table 1, the Delivery Module 112 may contact the ABC airline website (the Resource 116) and deliver the status of flight 4444 to the user's telephony device 112 via a short message service (SMS) message.

The Delivery Module 112 may deliver the content 118 via a "free" service, such as the transmission of a communication (e.g., an electronic mail communication, a conventional postal mail communication, or a telephonic communication), or a paid service, such as transmitting a SMS communication, where a telephone service providers charges for the transmission of the SMS message. Additional desired task may include, but are not limited to, requests for information from a remote data network (e.g., flight status, stock quote, sports score), initiation of an interactive game, or placement of a purchase order. It is important to note that even though the triggering of a desired task may be free, a use may still be charged fees for delivery of the associated content. For example, a telephony device may call a signaling number that triggers the desired task of receiving an SMS message that contains the local weather. In this example, a telephony device that is charged for each SMS message received will be charged a fee as a result of the desired task. In contrast, a telephony device may call a signaling number that triggers the desired task of receiving an e-mail that contains the local weather. In this example, the act of receiving the e-mail containing the local weather does not result in the accrual of a fee.

According to an embodiment of the present invention, the desired task and/or associated content may be location-specific, such that the physical location of the Telephony Device 102 initiating the connection request 114 is considered in defining the task and or content Location-specific services ma be provided by adding, integrating, incorporating, or including Global Positioning System (GPS) or other positioning information into the connection request information. For example, the current location of the Telephony Device 102 (i.e., location information) may be determined by a GPS-based application operating on the Telephony Device 102 and added to the connection request information. Alternately, the location information may be obtained from a Resource 116 by using connection request information. The location information may be extracted and used to identify the desired task and related content. For example, a Telephony Device 102 located in Newark, N.J. may initiate a connection request to a signaling number of (999-555-5555), which is associated with the general task of "returning the local weather," Next, the Desired Task identification Module 110 may examine the location information to determine the location for which the weather information is desired. Alternatively, the location of the user and/or Telephony Device 102 may be encoded as part of the originating number and/or the signaling number.

The Content Delivery System 100 of the present invention may include computer-based application/programs (i.e., software), hardware components, and/or a combination of both, configured to operate on a server residing in a telecommunications network. The Content Delivery System 100 may be established, in whole or in part, on a network node of the telecommunications network, such as, for example, a server, which may be associated with a telephone service provider.

According to an embodiment of the present invention, the Content Delivery System 100 may be configured to receive multiple connection requests 114 from numerous different origins, including any number of different telephone networks. Furthermore, the Content Delivery System 100 may be configured to receive connection requests 114 from traditional telephone networks (wired and wireless) as well as VOIP networks.

According to an embodiment of the present invention, the Content Delivery System 100 may be configured as a network node communicatively connected to a portion of an existing telephone network (herein, a telephone network computer). The Content Delivery System 100 may direct and/or control the operation and functionality of the telephone network computer and provide the telephone network computer with guidelines, instructions, and commands concerning incoming connection requests 114. This information may include the destination for which a connection request 114 should be transferred, as a well the way in which such information is transferred. For example, the Content Delivery System 100 may instruct the telephone network computer to transmit certain connection requests 114 to the Content Delivery System 100 for further processing, or instruct the telephone network computer to transfer, reject/drop, or connect a connection request. Communication with and configuration of the telephone network computer may be performed through a web-based interface or via another computer in the telecommunications network.

According to an embodiment of the present invention, the Content Delivery System 100 may be configured to deliver particular content based solely on the signaling number, in a manner which is independent of the originating number. For example, the methods and systems of the present invention may be configured to dispatch an SMS message containing the current stock price of Google in response to every connection request received including a particular signaling number.

As discussed above, the Content Delivery System 100 may be implemented as a software program, application, or applet operating on the Telephony Device 102. The Telephony Device 102 may include a graphical user interface (GUI) whereby a user may initiate a connection request via an interaction with the GUI (i.e., "clicking" a button on the GUI to input a command). The GUI and associated "links" may be associated with signaling numbers according to the present invention such that an interaction with the GUI results in the transmission of one or more connection requests 114 including a signaling number. According to this embodiment, the user of the Telephony Device 102 does not need to "dial" a signaling number, but instead may use the GUI to effectuate the initiation of a connection request for processing by the Content Delivery System 100. Advantageously, the GUI presents the user with information to allow the user to select a desired task, without the user having to determine the signaling number associated with the desired task.

According to an embodiment of the present invention, the Content Delivery System 100 may upload or download a list of signaling numbers for storage on access by the Telephony Device 102. The signaling numbers may be stored in the Telephony Device 102 in any suitable manner, including, but not limited to, by pre-programming by a telephony device manufacturer, a dynamic update or upload from the Content Delivery System 100, manual input by the user of the Telephony Device 102.

Figure 3:
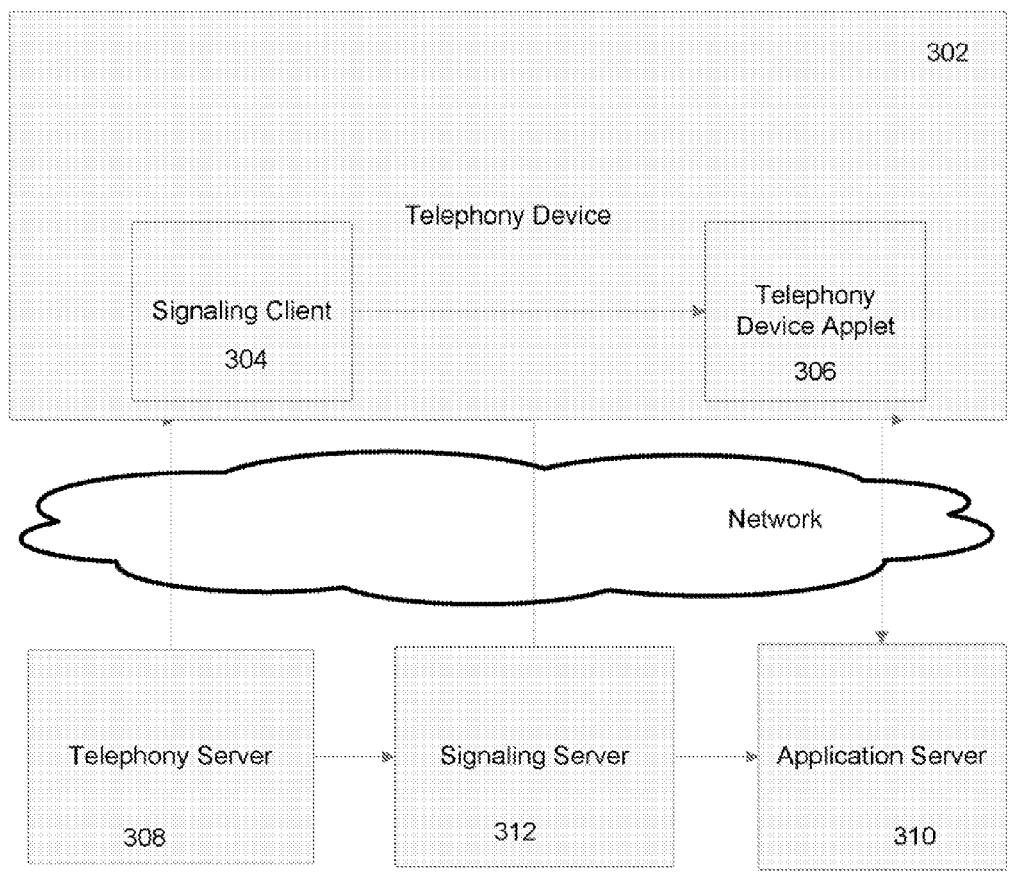
FIG. 3 illustrates an exemplary network environment including a content delivery system, according to an embodiment of the present invention.

According to an embodiment of the present invention, the methods and systems of the present invention may be implemented using a combination of "device-side" elements and related functionality and "network-side" elements and related functionality, as shown in FIG. 3. The device-side elements comprise a Telephony Device 302 including a Signaling Client 304 and a Telephony Device Applet 306. The network-side elements may be implemented using a single computer or server under the control of a single entity, or a network of computers or servers under the control of multiple entities. The network-side elements comprise a Telephony Server 308, an Application Server 310 and a Signaling Server 312.

One having ordinary skill in the art will appreciate that the embodiments of the content delivery systems and methods described below with reference to FIGS. 3-X may be implemented and embodied by the modules and functionality of the Content Delivery System 100 described in conjunction with FIGS. 1 and 2.

With reference to FIG. 3, as indicated above, the device side (i.e., Telephony Device 302) comprising the Signaling Client 304 and the Telephony Device Applet 306. The Signaling Client 304 is a software application/program which enables functionality of the Content Delivery System 100. The Signaling Client 304 may be configured as a passive (i.e., a thin client) or an active or sophisticated device (i.e., a fat client). If the Telephony Device 102 is a programmable device (e.g. a mobile phone or a programmable SIP phone), the Signaling Client 304 may be implemented as an application operable on any suitable platform, such as Java ME (Mobile Edition), Binary Runtime Environment for Wireless (BREW), Symbian or Windows Mobile. According to embodiments of the present invention, the Signaling Client 304 may be installed by the Telephony Device 302 manufacturer, by the mobile network operator, or by the user through an appropriate provisioning or installation process.

The Signaling Client 304 may be provided information by network-side entities about the signaling numbers. This information may be pre-configured in the Signaling Client 304 when it is installed, or it may be a part of a runtime-executable program or application. The signaling numbers may be provided dynamically or periodically updated (either on demand by the Signaling Client 304 or "pushed" to the Signaling Client 304 by the one or more network-side entities). Any one or more suitable methods of providing the signaling numbers may be used to the Signaling Client 304 may be implemented. One having ordinary skill in the art will appreciate that other suitable methods may be used to maintain the set of signaling numbers on the Signaling Client 304. Preferably, the set of signaling numbers may be maintained in persistent storage (e.g. flash memory) on the Telephony Device 302 to enable that data to persist in the Telephony Device 302 even after it is powered down and restarted.

If it is running on a programmable device, the Signaling Client 304 may interact with the phone network using a telephony Application Programming Interface (API) available in the Telephony Device 302. The telephony API is provided by the programming environment supported in the Telephony Device 302—e.g. Java ME (Mobile Edition), Binary Runtime Environment for Wireless (BREW), Symbian or Windows Mobile in mobile phones. The Signaling Client 304 uses this API to place calls, to be notified of incoming calls, and to cancel calls (both incoming and outgoing). The Signaling Client 304 may be configured to manipulate, manage, control, and/or intemperate with the signaling numbers, such that calls to and from other telephone numbers (i.e., non-signaling numbers) are processed according to the normal functionality systems, and processes of the Telephony Device 302.

According to an embodiment of the present invention, wherein the Telephony Device 302 is a programmable device, it may comprise a Telephony Device Applet 306, as shown in FIG. 3. One having ordinary skill in the art will appreciate that if the Telephony Device 302 is a non-programmable device, such as an ordinary analog phone, the Telephony Device Applet 306 is absent. In a programmable device (like a mobile phone or a programmable SIP phone) the Telephony Device Applet 306 is implemented as an application operating on a suitable platform like Java ME (Mobile Edition, BREW, Symbian or Windows Mobile that is available on Telephony Device 302.

The Telephony Device Applet 306 may be installed by the device manufacturer, by the mobile network operator, or by the end user through an appropriate provisioning or installation process. The Telephony Device Applet 306 may also be implemented as a behavior of the Signaling Client 304, and may be dynamically installed and activated by the Signaling Client 304.

According to an embodiment of the present invention, the Telephony Device Applet 306 may be created by the same administrative authority as the Signaling Client 304, and use the Signaling Client 304 for signaling. Multiple Telephony Device Applets 306 created by independent administrative authorities may run side by side, using the Signaling. Client 304 for signaling.

The Telephony Device Applet 306 is responsible for presenting a graphical user interface (GUI) to the user, presenting appropriate data to the user, managing the display etc. The Telephony Device Applet 306 utilizes the Signaling Client 304 to send connection requests, e.g., by invoking methods of an API or some equivalent communication method in the device. The Telephony Device Applet 306 is notified of the arrival of a connection request from the server-side by the Signaling Client 304 via the invocation of one or more methods of an API or some equivalent communication method in the Telephony Device 302.

The Telephony Device Applet 306 is configured to identify the appropriate signaling number associated with a desired task. According to embodiments of the present invention, the signaling number-desired task associations may be pre-configured in the Telephony Device Applet 306 when it is installed, provided to the Telephony Device Applet 306 when it starts to run, and/or provided dynamically or periodically updated (either on demand by the Telephony Device Applet 306 or pushed to Telephony Device Applet 306 by one or more network-side entities.

As provided above, the network-side of the content delivery environment of the present invention comprises the Telephony Server 308, the Application Server 310 and the Signaling Server 312. The Telephony Server 308 comprises a network-side computer-based element that receives the "physical" telecommunications communications of the methods and systems of the present invention from the conventional telephone network. The Telephony Server 308 may be physically interconnected to the telephone network (e.g., via a connection involving the termination of an SS7 signaling link), or it may be a "logical" link over an Internet Protocol (IP) or equivalent data network). The Telephony Server 308 may also be integrated in the systems and methods of the present invention by being implemented inside existing telephony signaling, equipment. The Telephony Server 308 may be implemented on either the "calling" or "called" side of the telephone network. Furthermore, the Telephony Server 308 may be implemented by the operator of the signaling service, outside of a phone network. The Telephony Server 308 may be implemented on a single computer, or equivalently on a collection of computers interconnected by a communication network, e.g. for redundancy, fail-over, fault-tolerance and scaling etc.

The Telephony Server 308 is configured to place and receive connection requests and calls from multiple telephony devices on the telephone network, and may span multiple phone networks. According to an embodiment of the present invention, the Telephony Server 308 is implemented as a VOW protocol application server (e.g., a Session Initiation Protocol (SIP) application server), a Parlay/OSA application server, an IN(Intelligent Network)/WIN(Wireless Intelligent Network) application, or as a server implemented using any other equivalent telecommunications equipment programming API.

The Telephony Server 308 is configured to receive connection requests for incoming calls directed to at least a portion of the signaling numbers. According to an embodiment of the present invention, the signaling numbers that the Telephony Server 308 is adapted to receive are provisioned when the Telephony Server 308 is interconnected to the telephone network to allow the telephone network to appropriately route or deliver such incoming calls to the Telephony Server 308.

For example, the Signaling Server 312 administrator may set up an account for the Telephony Server 308 administrator. The Signaling Server 312 provides an administrative interface (e.g., a web-based interface) that enables the Telephony Server 308 administrator to maintain the set of numbers that the Telephony Server 308 is responsible for (i.e., the signaling numbers). The Telephony Server 308 administrator uses the interface to add, review, update and delete signaling numbers handled by the Telephony Server 308. The Telephony Server 308 administrator may also use the interface to specify how the Signaling Server 312 communicates with the Telephony Server 308. For example, the administrator may specify a URL to which the Signaling Server 312 may send directives for processing by the Telephony Server 308. One having ordinary skill in the art will appreciate that the Telephony Server 308 may be configured to support other known methods of communication with the Signaling Server 312.

The Telephony Server 308 may be implemented as a single server, or as a collection of servers, optionally within multiple administrative domains. The Telephony Server 308 may handle incoming calls for all or for only a subset of the signaling numbers. In an exemplary embodiment, the phone network notifies the Telephony Server 308 of an incoming call. For example, in a SIP implementation, the incoming connection request/call is noted by the arrival of an INVITE message in the SIP protocol. The Telephony Server 308 notifies the Signaling Server 312 of the connection request and provides the Signaling Server 312 with the connection request information. For example, this may be done by sending an HTTP protocol message to the Signaling Server 312. The Telephony Server 308 may use other known methods to notify the Signaling Server 312 of the connection request.

The Telephony Server 308 rejects the connection request prior to completion thereof thus incurring no charge to the caller. For example, in a SIP implementation, the Telephony Server 308 may reject the connection request by sending a BUSY message in the SIP protocol. Other methods of rejecting the call may be implemented, allowing the connection request to continue to ring till it is cancelled by the Telephony Device 302, or by transferring the connection request to a different server that in turn prevents completion of the call.

According to an embodiment of the present invention, the Telephony Server 308 is configured to transfer incoming connection requests, under directive from the Signaling Server 312. For example, the Signaling Server 312 may ask the Telephony Server 308 to transfer the connection request to a different entity, such as a media server enabled to play an announcement, or present data in audible form. The transfer directive comprises information such as the phone number to transfer the connection request to, and other information that may be useful for the Telephony Server 308. For example, in a SIP implementation, the Telephony Server 308 may transfer the connection request by executing a REDIRECT using the SIP protocol, or other like methods for transferring the connection request.

According to an embodiment of the present invention, the Telephony Server 308 is configured to place calls with a called party pursuant to directives received from the Signaling Server 312. The Telephony Server 308 may receive the directive from a Signaling Server 312 as a HTTP protocol message or other suitable method of communication. The directive may comprise the signaling number, the originating number, and related information that may be useful for the Telephony Server 308. The Telephony Server 308 is configured to reject any calls that it places, under directives from the Signaling Server 312. The directive to cancel a call may be delivered along with the directive to place a call (e.g., a request to connect to signaling number 12345 including a directive to reject or terminate the call after 5 seconds if it was not already rejected/cancelled.)

According to embodiments of the present invention, the network-side of the content delivery environment comprises the Application Server 310, a computer configured to execute applications according to the content delivery methods and systems of the present invention. The Application Server 310 may be implemented using standard programming languages, such as, for example, C, Java, PHP, Ruby as configured for a server environment. The Application Server 310 may interface with one or more Signaling Servers 312, including those that do not reside in the same administrative domain. For example, the Application Server 310 may be operated by a weather reporting service, while the Signaling Service 312 may be operated by a separate signaling service operator. The Application Server 310 is also configured to communicate with the Telephony Device Applet 306.

The Signaling Server 312 is a network-side element configured to receive and process "logical" connection requests, connection request information, and/or instructions from the Telephony Server 308, according to the content delivery systems and methods of the present invention. The Signaling Server 312 processes the connection request information, interacts with the Application Server 310 to infuse application-specific logic and actions, and/or if instructed by the Application Server 310 to do so, the Signaling Server 312 instructs the Telephony Server 308 to reject/place/transfer/cancel calls to the Telephony Device 302 and to deliver content thereto. The Signaling Server 312 may also be configured to transmit other data (e.g. connection request information such as the signaling number(s), etc.) to the Telephony Device 302.

The Signaling Server 312 may be hardware/software combination implemented using conventional programming/platforms supported in a typical computer/server environment, such as C, Java, PHP, Ruby, etc. The Signaling Server 312 may be communicatively connected to and interface with one or more Telephony Servers 308, Application Servers 310, and/or Signaling Clients 304 from one or multiple networks or administrative domains. The Signaling Server 312 tray be implemented on a single physical computer, or on a networked collection of computers to allow for redundancy, fail-over, fault-tolerance and scaling.

The Signaling Server 312 administrator may be authorized to set up an account for every Telephony Server 308 and Application Server 310 administrator to allow the administrators to interact with the content delivery system of the present invention. In so doing, the Signal Server 312 administrator provides the Telephony Server 310 and the Application Server administrators with information needed to configure the Telephony Server 308 and Application Server 310 to communicate with the Signaling Server 312, such as, for example, URLs and/or descriptions of the program interface, authentication credentials, etc.

According to an embodiment of the present invention, the Signaling Server 312 is configured to receive connection request information from a Telephony Server 308 in any suitable communication format (e.g., an HTTP protocol message). As provided above, the connection request information may comprise the originating number, the signaling number, and other related information. Upon receipt of the connection request information from a Telephony Server 308, the Signaling Server 312 creates an instance of the applet described in the Applet Descriptor, unless one already exists for that connection request and/or desired task. An "instance" is a data structure that contains the runtime data needed to maintain state and to perform the desired task. Importantly, multiple instances of applets using the same Applet Descriptor may exist at the same time, each representing a separate connection request interaction.

According to an embodiment of the present invention, the Signaling Server 312 may send instructions or directives to the Telephony Server 308 to transfer the connection, place a call to/from a signaling number, or reject/cancel the connection request. The Signaling Server 312 is configured to maintain a list of signaling numbers and related associations. The Signaling Server 312 may provide an administrative interface that allows one or more Telephony Server 308 administrators to maintain the review, modify, access, and/or change the signaling numbers for which the Telephony Server 308 maintains responsibility.

According to an embodiment of the present invention, the Signaling Server 312 is responsible for transmitting the one or more signaling numbers to the Signaling Client 304. For example, this information may be conveyed to the Signaling Client 304 as part of the installation process or at the time the Signaling Client 304 is initially launched. This information may be conveyed to the Signaling Client 304 when it runs for the first time. The signaling numbers and related information may be conveyed dynamically to the Signaling Client 304 and periodically updated by the Signaling Server 312. The signaling numbers may be transmitted to the Signaling Client 304 via a SMS communication as the payload of the message, via the use of a message that directs the Signaling Client 304 to establish a data connection to fetch the relevant data, other conventional data transmission methods, or a combination thereof.

According to an embodiment of the present invention, the Signaling Server may publish a set of signaling numbers, either directly or via a third party. In this embodiment, users may load these available signaling numbers into their phone contact lists. Furthermore, users may use other facilities to automatically install the signaling numbers into their phone contact lists, which is particularly beneficial for non-programmable Telephony Devices 302 or Telephony Devices 302 with no Signaling Client 304 installed.

The Application Server 310 administrator creates "Applet Descriptors" and uploads them to the Signaling Server 312. The term "Applet Descriptor" is intended to include, but is not limited to, a software application capable of execution within another software program. The Applet Descriptor may be configured as a script for the Signaling Server 312, executed on behalf of the Application Server 310. The Applet Descriptors allow the Signaling Server 312 to infuse Application Server-specific information and/or behavior into the connection request information and/or creation of Application Descriptors that deliver enhanced value to the user.

The Applet Descriptor comprises the originating number, the signaling number, a telephony action code comprising instructions to the Telephony Server 308 regarding handling of the connection request (i.e. CANCEL, COMPLETE-CANCEL, etc.), information related to the desired task, and/or information related to the content associated with the desired task (i.e., information that identifies the appropriate Resource associated with the content to be delivered to the user). The telephony action code specifies what to do with the incoming call (carrying the connection request). And the application action usually specifies a URL pointing at a Resource 116 controlled by the Application Server 310 administrator (where the Application Server 310 can execute arbitrary program code of its choosing.) The Application Server 310 sends a responsive document or instructions referred to as a Signaling Descriptor to the Signaling Server 312 comprising instructions regarding the steps to be taken.

The following is an exemplary Applet Descriptor:

```
<applet id="1" name="simpleDataGetter">
    <catchSignal
        calledPattern="16005551212"
        appAction="getData"
        telephonyAction="CANCEL"
        appURL="http://appserver/sendMessage"
        appData="CALLER,CALLED,appAction"
    />
    <sendSignal
        callerPattern="16005551212"
        appAction="sendData"
    />
</applet>
``` wherein the "catchSignal" specification describes the inbound connection request; the "calledPattern" describes the signaling number; the "telephonyAction" describes the requested handling of the connection request; the "appURL" describes the desired task; and the "sendSignal" specification describes the content delivery (i.e., the outbound communication). In operation, when the Signaling Server 312 receives a communication from the Telephony Server 308 for a signaling number that matches the specified pattern (defined by the value of "calledPattern"—16005551212 in this example), it instructs the Telephony Server 308 to cancel the call (based on the CANCEL telephony action code), and then accesses the resource and associated content identified by the application URL (appURL). The Signaling Server 312 then sends a communication to the Application Server 310 including application data (per the appData specification) comprising the content to the originating number (indicated by the keyword CALLER), the signaling number (indicated by the keyword CALLED) and the application action (indicated by the term "appAction"). The Application Server 310 may then use the data as appropriate. For example, the Application Server 310 may look up an originating number in its internal database, retrieve an associated electronic mail address and send a communication to the electronic mail address. In another example, the Application Server 310 may use the originating number, provide it to a service that identifies it as a mobile number, and send an SMS to the originating number. Next, the Signaling Server 312 reviews the "sendSignal" specification to determine the details related to the delivery of the content.

The Application Server 310 responds to receipt of the desired task (i.e., the access of appURL) via a Signaling Descriptor. The Signaling Descriptor is a script for the Signaling. Server 312 that is configured to instruct the Signaling Server 312 if any subsequent action is required. The Signaling Descriptor may be in the form of a simple text document, a rich XML document, or other suitable file/program types. The Signaling Descriptor may comprise any communication-related information, such as the desired task (i.e., the requested action) and the data that may be needed for execution of the desired task.

The following is an exemplary Signaling Descriptor:

```
<signal>
    <dataAction payload="some data for User Applet" />
</signal>
```

The above Signaling Descriptor instructs the Signaling Server 312 that the Application Server 310 requests the transmission of data to the Telephony Device Applet 306 (based on the "dataAction" command). This allows the Application Server 310 to transmit data (specified as the value of "payload" to the Telephony Device Applet 306 by piggybacking on the channel that the Signaling Server 312 uses to communicate with the Signaling Client 304.

Another exemplary Signaling Descriptor provides:

```
<signal>
    <noAction />
</signal>
```

This exemplary Signaling Descriptor instructs the Signaling Server 312 to take no further action, (based on the "noAction" command). This may be used if there is nothing that needs to be done, and is typically the case if the connection request has already been rejected/canceled.

Yet another exemplary Signaling Descriptor provides:

```
<signal>
    <transferAction
        transferNumber="19175551212"
    />
</signal>
```

This exemplary Signaling Descriptor instructs the Signaling Server 312 to transfer the connection request to a signaling number (based on the "transferAction" command), with the target signaling number specified by the value of transferNumber.

Another exemplary Signaling Descriptor provides:

```
<signal>
    <signalAction
```

```
            toNumber="19081234567"
            fromNumber="19175551212"
        />
</signal>
```

This exemplary Signaling Descriptor instructs the Signaling Server 312 to deliver content (based on the "signalAction" command) to the phone number specified by the value of "toNumber," from the originating number specified by the value of "fromNumber." It is noted that the "fromNumber" is first specified in the Applet Descriptor "sendSignal,"—i.e., it must match the "callerPattern."

Another exemplary Signaling Descriptor is as follows:

```
<signal>
        <endAction />
</signal>
``` and indicates to the Signaling Server 312 the end of an interaction sequence (based on signaling action "endAction").

Note that the actual syntax of the Applet Descriptor and Signaling Descriptor is not significant. These Descriptions may be expressed in many different ways and in many different programming languages, with the important consideration being that the Application Server 310 is able to specify to the Signaling Server 312 the details of a connection request, including the numbers the application uses to receive and send messages and how the Application Server 310 is involved in handling a received, communication. According to an embodiment of the present invention, the Application Server 310 may execute arbitrary logic upon receipt of a connection request, using data passed to it by the Signaling Server 312 along with any other data that the Application Server 310 has access to, and then may direct the Signaling Server 312 to perform some action, using data that it passes to the Signaling Server 312. Alternately, the Application Server 310 may spontaneously direct the Signaling Server 312 to perform some action e.g., deliver content).

There are no restrictions on the amount of information that may be passed between the Application Server 310 and the Signaling Server 312. For example, the Applet Descriptor may contain multiple "catch" specifications, to trap different connection requests, and, likewise, the Signaling Descriptor may contain multiple actions. A session identifier or "cookie" may be used between Application Server 310 and Signaling Server 312 to allow the application operating thereon to keep track of the state of an interaction across multiple connection request exchanges. Likewise, the Signaling Server 312 and the Application Server 310 may communicate more data using any equivalent data exchange mechanism.

The following is an exemplary Applet Descriptor relating to a voting application utilized by users of the content delivery system and methods of the present invention, in this example, the Applet Descriptor provides:

```
<applet id="2" name="voteCounter">
        <catchSignal
                calledPattern="16005551213"
                appAction="yesVote"
                telephonyAction="CANCEL"
                appURL="http://appserver/countVote"
                appData="CALLER,CALLED,appAction"
```

```
        />
        <catchSignal
                calledPattern="16005551214"
                appAction="noVote"
                telephonyAction="CANCEL"
                appURL="http://appserver/countVote"
                appData="CALLER,CALLED,appAction"
        />
</applet>
```

This exemplary Applet Descriptor describes an applet that uses two phone numbers, one to capture "yes" votes and one to capture "no" votes from users, wherein the "appAction" operation is a symbolic name for the applet action. The Signaling Server 312 accesses the appURL to have the Application Server 310 take requested action to perform the desired task. The Application Server 310 records the vote from the user/caller (using either the value of appAction or the signaling number).

The following is an exemplary Applet Descriptor that relates to the playing of a game of "Tic Tac Toe" between to users of the content delivery system and methods of the present invention. In this example, the Applet Descriptor provides:

```
<applet id="3" name="ticTacToeGame">
        <catchSignal
                calledPattern="16005551310"
                appAction="startGame"
                telephonyAction="CANCEL"
                appURL="http://appserver/startGame"
                appData="CALLER,CALLED,SESSION,appAction"
                session="START"
        />
        <catchSignal
                calledPattern="1600555131[1-9]"
                appAction="gameMove"
                telephonyAction="CANCEL"
                appURL="http://appserver/makeMove"
                appData="CALLER,CALLED,SESSION,appAction"
        />
        <catchSignal
                calledPattern="16005551320"
                appAction="endGame"
                telephonyAction="CANCEL"
                appURL="http://appserver/endGame"
                appData="CALLER,CALLED,SESSION,appAction"
                session="END"
        />
        <sendSignal
                callerPattern="16005551310"
                appAction="startGame"
        />
        <sendSignal
                callerPattern="1600555131[1-9]"
                appAction="gameMove"
        />
        <sendSignal
                callerPattern="16005551320"
                appAction="endGame"
        />
</applet>
```

The above Applet Descriptor describes an applet that uses eleven phone numbers, one to start a Tic Tac Toe game, nine to capture moves, and one to end the game, wherein the "appAction" is a symbolic name for the applet action. The Applet Descriptor also provides instructions to send connection requests using eleven phone numbers to signal the start of the game, the game moves and the end of the game. The Signaling Server 312 accesses the "appURL" to have the Application Server 310 take the desired action. The Application Server 310 records the game move received from the first player/caller (based on the signaling or "called" number in this case) and signals the Signaling Server 312 to signal the move to the second player/caller (via an appropriate Signaling Descriptor).

The Signaling Server 312 starts a "session" when the "startGame" signal is received and passes the session identifier to the Application Server 310. The Application Server 310 uses the session identifier to keep track of a game across several signals. The Signaling Server 312 may then end the "session" when the "endgame" signal is received.

According to an embodiment of the present invention, the Signaling Server 312 is responsible for maintaining the set of active User Applets 306, based on the set of active Applet Descriptors, described in detail below. It provides an administrative interface that allows an Application Server 310 administrator to maintain the set of Applet Descriptors that the Application Server 310 is responsible for. The Signaling Server 312 is configured to interface with one or more Application Servers 310, wherein the active Applet Descriptors of all the Application Servers 310 that the Signaling Server 312 connects to constitute the Signaling Server's active Applet Descriptor set.

The Signaling Server 312 is configured to propagate information about the active Applet Descriptors to the Signaling Client 304. This information may be conveyed to the Signaling Client 304 as part of the installation process (i.e., when the Signaling Client 304 is installed or when the Telephony Device Applet 306 is installed), or conveyed to the Signaling Client 304 when it runs for the first time. One having ordinary skill in the art will appreciate that this information may be conveyed dynamically to the Signaling Client 304 and periodically updated by the Signaling Server 312. The active Applet Descriptors may be transmitted to the Signaling Client 304 via any suitable communications channel or method, such as, for example, via the payload of a SMS message, or via a message directing the Signaling Client 304 to establish a data connection to fetch the relevant data. One having ordinary skill in the art will appreciate that any combination of these methods any other suitable methods may be used to communication this data into the Signaling Client 304.

The Applet Descriptor information that is passed to the Signaling Client 304 and Telephony Device Applet 306 by the Signaling Server 312 is extracted from the Applet Descriptor. The Applet Descriptor information may comprise the connection request information, including, for example, the originating number (i.e., the "callerPattern" information), the signaling number the "calledPattern" information) and desired task information the "appAction" data) from the "catchSignal" specification and the "sendSignal" specification. This information provides context information to the Signaling Client 304 Telephony Device Applet 306 about the connection requests that are needed to implement the desired task(s) and deliver the related content. The Applet Descriptor information may be used by the Telephony Device Applet 306 to present an appropriate user interface to the user, and provides information about the desired task(s) to be performed when the user or application triggers a particular interaction (i.e., via an interaction with the user interface such as clicking on an icon).

When the Signaling Server 312 receives a Signaling Descriptor from an Application Server 310 with and "endAction" action, such as the following:

```
<signal>
    <endAction />
</signal>
``` the Signaling Server 312 terminates the applet instance and clears out appropriate data structures. Optionally, the Signaling Server 312 may also instruct the appropriate Signaling Client 304 to end the appropriate Telephony Device Applet 306 in the Telephony Device 302.

According to an embodiment of the present invention, the Signaling Client 304 may be enabled to perform one or more functions that require an active state to be maintained, whereby a "session" is established between the Telephony Device 302 and the Telephony Server 308, the Application Server 310 and/or the Signaling Server 312. In such an embodiment, the Signaling Client 304 is configured to store information from previous interactions with the network-side elements, thereby allowing for future communications to utilize historical information. For example, the Signaling Client 304 may receive information that it may not be capable of processing at a given time, however by maintaining an active state, the applet may access the information or request a retransmission once processing can begin. The ability to maintain a state may also be used in order to perform desired tasks that require a series of interactions between the Signaling Client 304 and the network-side elements. In certain embodiments of the present invention, the state of the Telephony Device 302 may be maintained whether the Telephony Device 302 is an "on" or "off" state. For example, the Signaling Client 304 may store information received while the user is on a call that may not be processed because the Telephony Device 302 does not support the use of applications while a all is in progress.

According to an embodiment of the present invention, the Signaling Client 304 may maintain shared context in cooperation with network-side entities. This information may be pre-configured in the Signaling Client 304 when it is installed. Alternately, this information may be provided to the Signaling Client 304 at runtime or dynamically provided and periodically updated (either on demand by the Signaling Client 304 or by being pushed to the Signaling Client 304 by one or more of the network-side elements).

As provided above, the Applet Descriptors describe and define the interaction from the Signaling Server 312 to the Application Server 310. Furthermore, the Application Server 310 generates Signaling Descriptors that describe and define the interaction from the Application Server 310 to the Signaling Server 312. According to an embodiment of the present invention, the Signaling Server 312 may be configured to support the use of "symbolic signaling numbers (SSN)" to convey information related to the connection request. According to this shortened numbering convention, the same amount of information as would be conveyed using the full originating number and the signaling number may be conveyed using a "symbolic" or shortened identifier. For example, instead of transmitting the originating number "123-555-1234" and the signaling number "987-555-9876" through use of SSN, a shortened identifier of "/1234/1" may be assigned to the connection request and processed according to the content delivery systems and methods of the present invention. The Signaling Server 312 may be configured to properly decipher the SSN message. For example, the "/1234/1" identifier may be associated with the desired task of "return content related to a first pre-set task associated with originating number 123-555-1234". As described above, the desired task associations may be stored in a hash table or like data structure. Therefore, through use of SSN, the Signaling Server 312 may process a given connection request without transmitting a complete originating number/signaling number pair. The following example illustrates an Applet Descriptor using symbolic signaling numbers "/1002/1" and "/1002/2":

```
<applet id="1002" name="simpleDataGetter">
    <catchSignal
        calledPattern="/1002/1"
        appAction="getData"
        telephonyAction="CANCEL"
        appURL="http://appserver/sendMessage"
        appData="CALLER,CALLED,appAction"
    />
    <sendSignal
        callerPattern="/1002/2"
        appAction="sendData"
    />
</applet>
```

While some of the applications according to the present invention are based on signaling numbers provided by the public telephone network (e.g., a signaling number that encodes an airline as well as a flight number, or a signaling number that triggers the sending of a coupon by electronic mail), many applications do not need to use a public signaling number. For example, wherein the application is a conventional Tic Tac Toe game, the content delivery system and methods of the present invention do not care about the specific signaling number used to request a particular game move, as long as the content delivery systems and methods are able to unambiguously determine what game move the user is requesting.

According to an embodiment of the present invention, the Signaling Server 314 may be configured to support such applications via Managed Signaling Numbers (MSN). Managed Signaling Numbers may be selected from a pool of signaling numbers that are supported by connected Telephony Servers 308, but not explicitly referenced in any Applet Descriptors, and are also not explicitly publicized (i.e., not public signaling numbers). The Applet Descriptors for such applications contain only symbolic signaling numbers. The Signaling Server 314 dynamically determines which signaling number from its pool of Managed Signaling Numbers to allocate to a particular connection request. Importantly, only the originating numbers need to be allocated when the Apple Descriptor is activated. Also, different phone numbers can be used for different Signaling Clients 314. Other phone numbers for subsequent interaction, if any, in an applet may be committed after the signaling sequence starts i.e., when the Signaling Server instantiates the applet. (Note that this will require communication with the Signaling Client 314 to bring its shared context up to date.) Also, phone numbers need to be committed only for the duration of the signaling interaction. Subsequently, the signaling number may be returned to the pool of available Managed Signaling Numbers for re-use.

The use of the Managed Signaling Numbers method provides the Signaling Server 314 with increased flexibility, functionality, and benefits, including, but not limited to: signaling load reduction; load balancing, user privacy, and protection against distributed denial of service attacks; as described in detail in the following paragraphs.

Signaling Load Reduction: According to art embodiment of the present invention, the Signaling Server 314 may use knowledge of the location of devices with Signaling Clients 304 to select signaling numbers from the MSN pool that are "close" to the Telephony Device 302 from the network perspective. For example, through a separate communication, channel, the Signaling Server 314 may discover that a Signaling Client 304 is roaming on a different phone network (i.e., the visited network), and may switch to using a signaling number associated with Telephony Servers 308 in the visited network. Similarly, through a separate communication channel, the Signaling Server 314 may discover that a Signaling Client 304 is in a particular part of a mobile network operator's phone network, and may switch to using a signaling number associated with Telephony Servers 308 in the proximity. As such, this technique may be used to minimize the load on the backbone telecommunications network.

Load Balancing: According to an embodiment of the present invention, the Signaling Server 314 uses knowledge of the "load" in the telecommunications network to balance the signaling load from the network perspective. For example, through information that it maintains or through a separate communication channel, the Signaling Server 314 may determine that some Telephony Servers 308 are over-loaded, while others are idle, and may switch to using signaling numbers associated with lightly-loaded Telephony Servers 308. As such, this technique may be used to balance the load on the telecomm signaling network and avoid overload and hotspots.

User Privacy: Since the signaling numbers associated with different applications and desired tasks may change using the Managed Signaling Numbers method, and may be different for different Signaling Clients 304, a remote entity is prevented from tracking and analyzing the signaling numbers to infer what applications a user is using.

Protection against Distributed Denial of Service Attacks: Since the signaling numbers associated with different applications may change using the Managed Signaling Numbers method, and may be different for different Signaling Client 304, a remote entity is restricted from easily conducting a distributed denial-of-service attack against a particular application.

Figure 4:
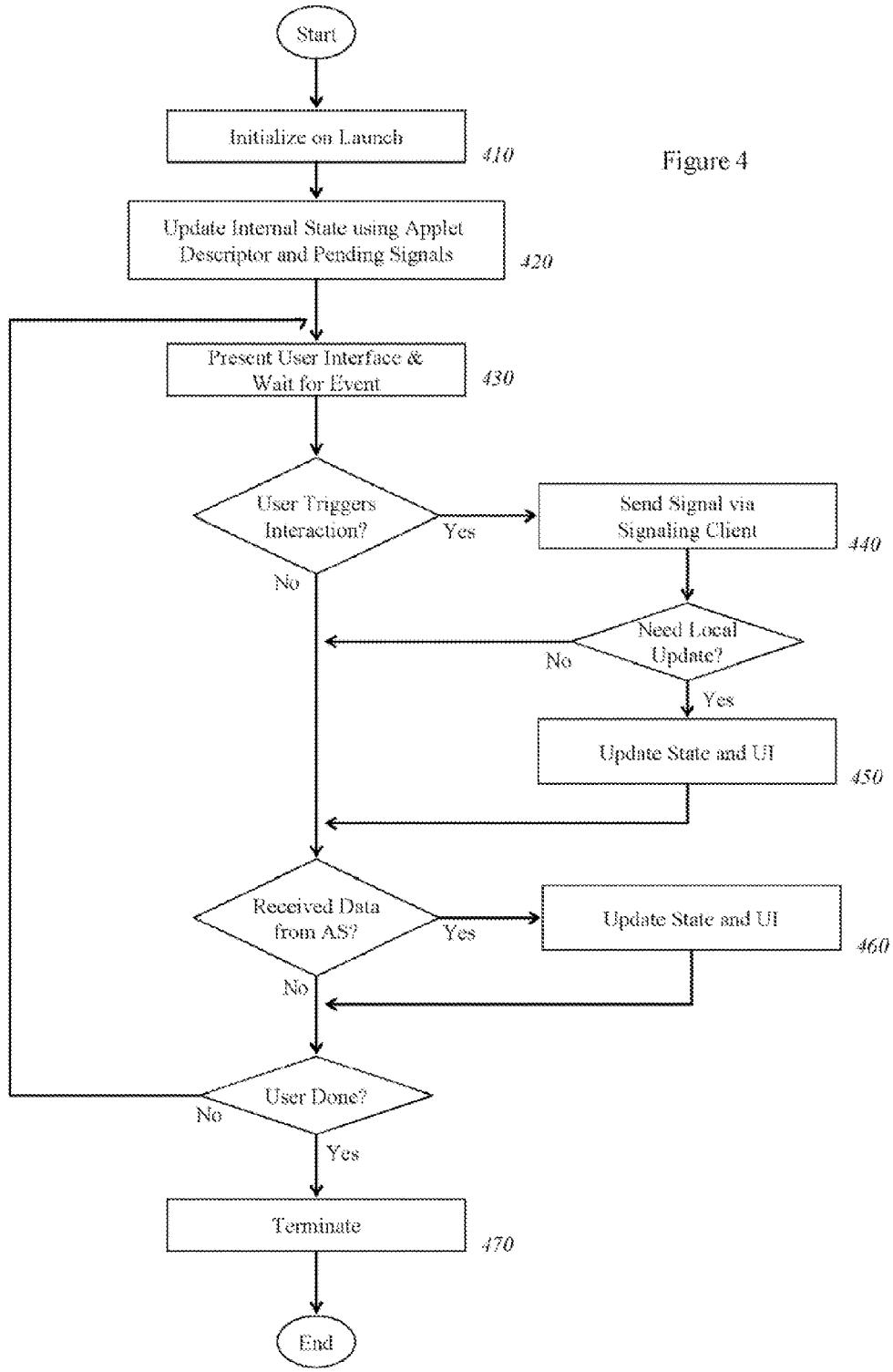
FIG. 4 illustrates an exemplary process for the operation of an exemplary Telephony Device Applet, according to an embodiment of the present invention.

FIG. 4 illustrates an exemplary process flow showing the operation of an exemplary Telephony Device Applet 306, according to an embodiment of the present invention. In step 410, the Telephony Device Applet 306 initializes when the application is launched. Next, in step 420, the Telephony Device Applet 306 obtains Applet Descriptor information as well as any pending communications from the Signaling Client 314, and uses it to update its internal state, In step 430, the Telephony Device Applet 306 presents a user interface that allows the user to submit a connection request (i.e., a request for a connection associated with the execution of a desired task). Next, in step 440, if the user submits a connection request, the Telephony Device Applet 306 sends a signal to the Application Server 310 (via the Signaling Client 304 and the Signaling Server 312).

In step 450, the Telephony Device Applet 306 updates its internal state a well as the user interface (identified as "UI" in the Figures) that is presented to the user, if needed. Optionally, the Telephony Device Applet 306 may receive data from the Application Server 310 (identified as "AS" in the Figures) spontaneously or in response to a signal (either directly or through the Signaling Client 304), and then subsequently updates internal state as well as the user interface that is presented to the user, in step 460. Optionally, the user may repeatedly use the Telephony Device Applet 306 to submit multiple connection requests. Finally, in step 470, the Telephony Device Applet 306 terminates when the user ends the application.

Figure 5:
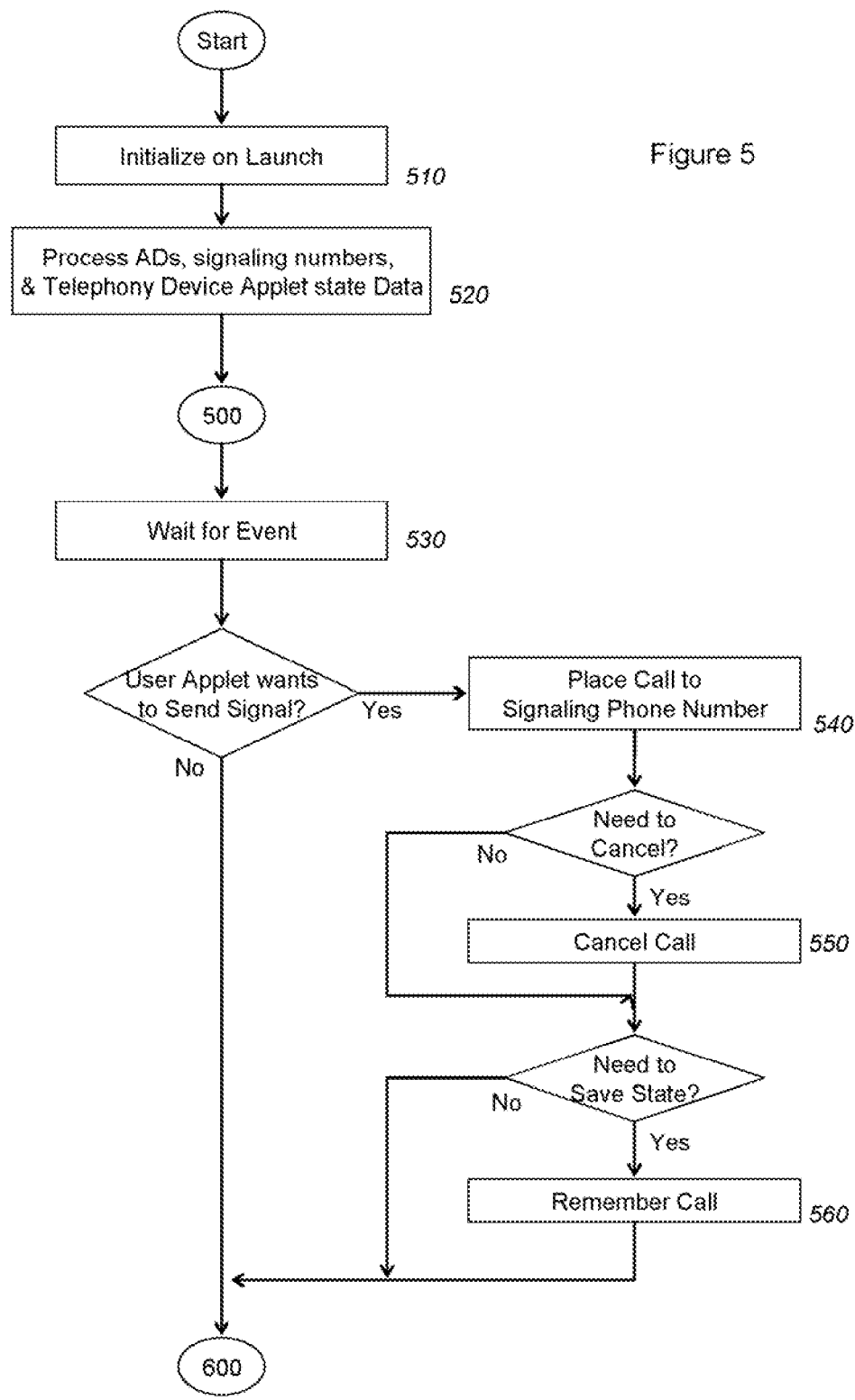
FIGS. 5 and 6 illustrate an exemplary process for the operation of an exemplary Signaling Client, according to an embodiment of the present invention.
Figure 6:
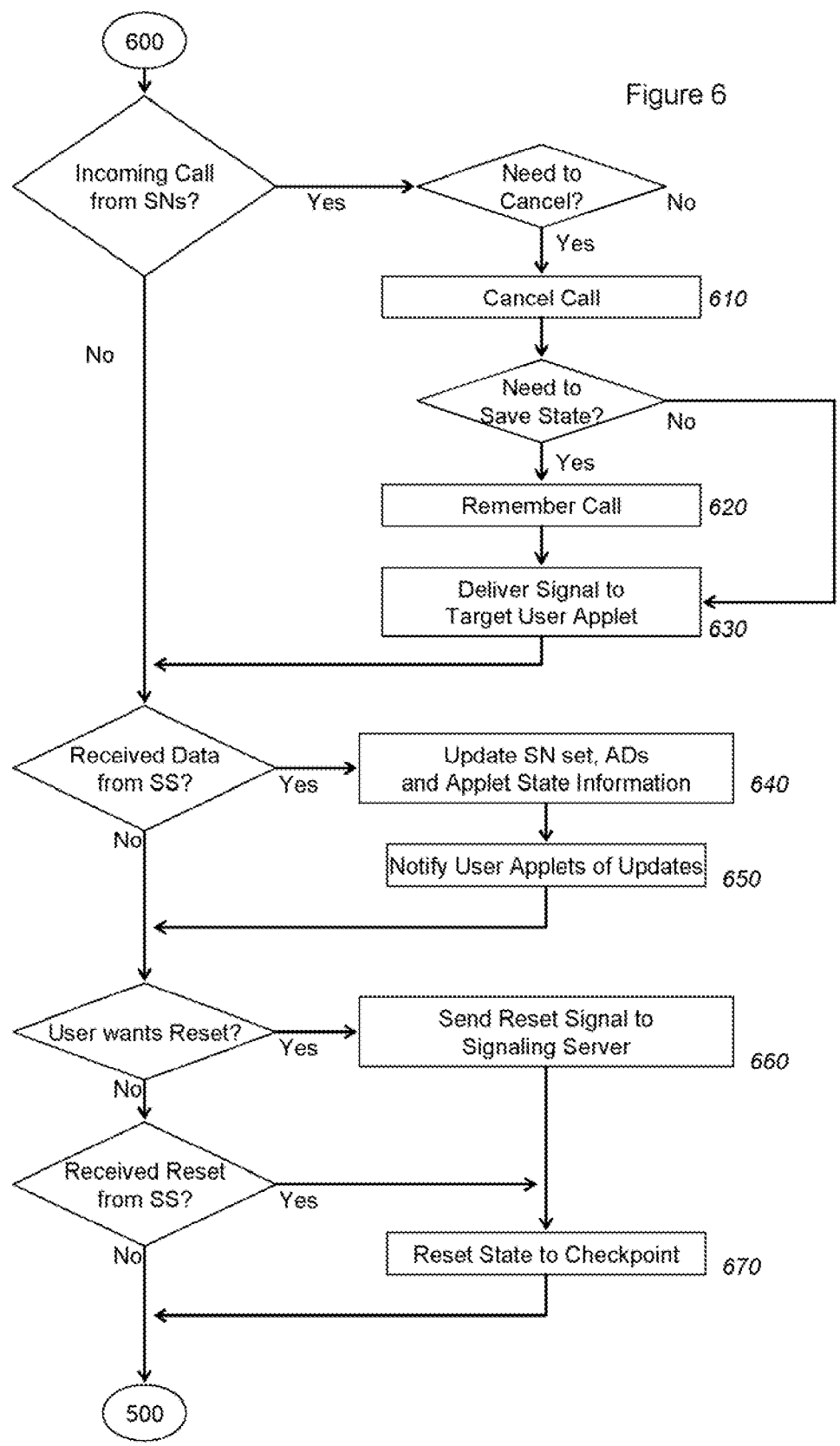

FIGS. 5 and 6 illustrate an exemplary process flow showing the operation of an exemplary Signaling Client 304, according to an embodiment of the present invention. In step 510, the Signaling Client 304 is launched and initialized. In step 520, the Signaling Client 304 processes a set of signaling numbers, the available Applet Descriptors (identified as "AD" in the Figures) state information related to the Telephony Device Applet 306, and/or maintains internal data structures, and, in step 530, awaits receipt of a signaling event. If the Signaling Client 304 receives a request from a Telephony Device Applet 306 to send a signal, it places a connection request to the appropriate signaling number (per the Applet Descriptor) to send the signal, in step 540. In step 550, the Signaling Client 304 rejects the connection request, if necessary. The Signaling Client 304 optionally stores the sent signal in its local state, in step 560.

If the Signaling Client receives a signal from the Signaling Server 312 in the form of an incoming call from a signaling number (identified as "SN" in the Figures), it rejects the call, if necessary, in step 610. The Signaling Client 304 may then optionally store the received signal in its local state, in step 620. In step 630, the Signaling Client 304 identifies the appropriate Telephony Device Applet 306 that it must send the signal to (based on information in the Applet Descriptor) and signals the target Telephony Device Applet 306. Optionally, the Signaling Client 304 may receive data from the Signaling Server 312, and updates the signaling number set, the Applet Descriptor set, and the state information of the Telephony Device Applet 306, in step 640, and notifies the Telephony Device Applet 306 of relevant updates, in step 650. If the user resets the Signaling Client 304, it sends a reset signal to the Signaling Server 312, in step 660. If the user resets the Signaling Client 304 or if a reset signal is received from the Signaling Server 312, the Signaling Client 304 resets state to a checkpoint, in step 670.

Figure 7:
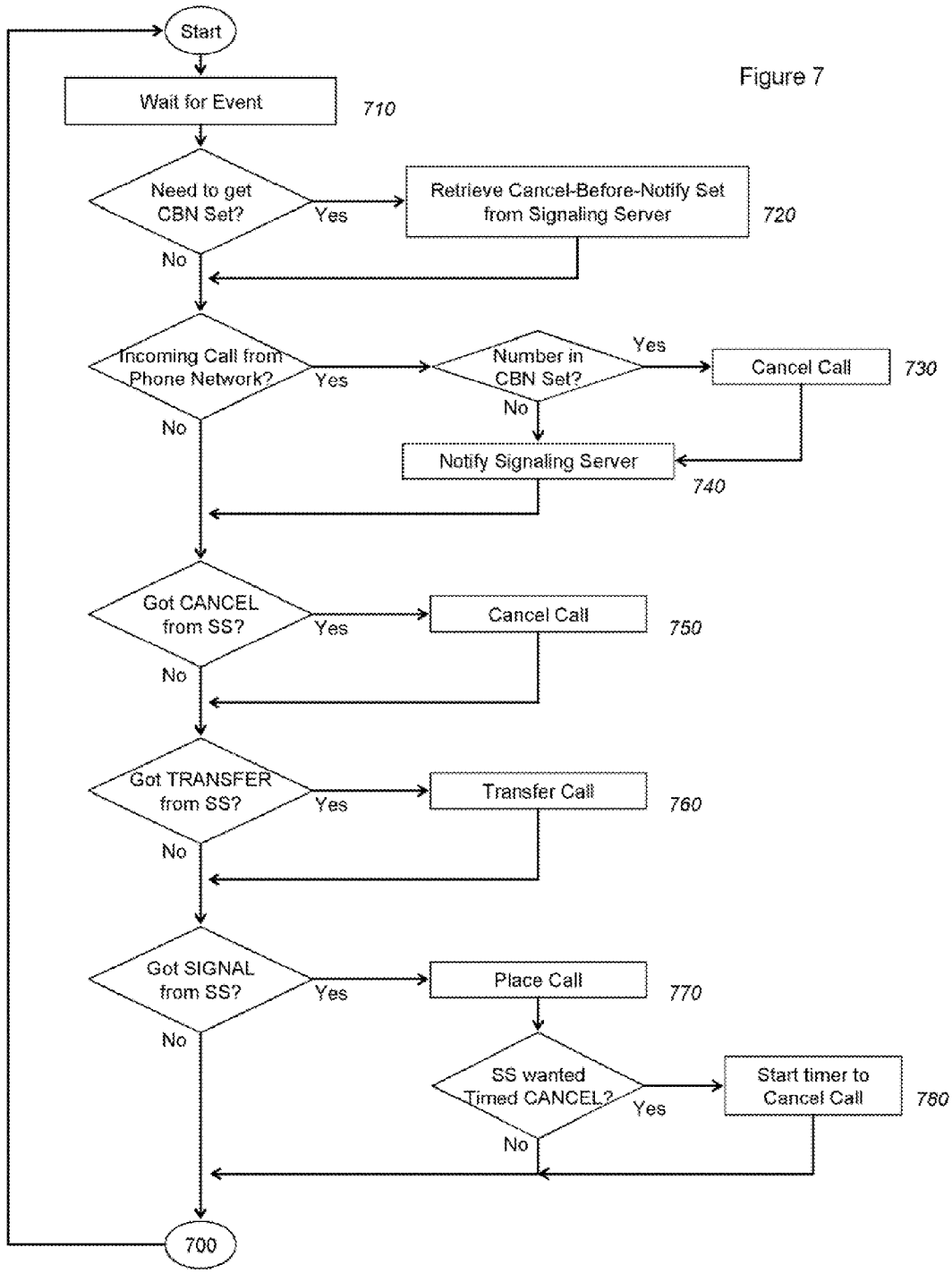
FIG. 7 illustrates an exemplary process for the operation of an exemplary Telephony Server, according to an embodiment of the present invention.

FIG. 7 illustrates an exemplary process flow showing the operation of an exemplary Telephony Server 308, according to an embodiment of the present invention. The Telephony Server 308 is configured to wait for events triggered by a communication from either the phone network or the Signaling Server 312, or from its internal logic, in step 710. The Telephony Server 308 retrieves a Cancel-Before-Notify (identified as "CBN" in the Figures) subset of signaling numbers from the Signaling Server 312, if necessary, in step 720. If the Telephony Server 308 receives an incoming call notification from the phone network, it checks if the called number is in the Cancel-Before-Notify set. If it is, the Telephony Server 308 rejects the call, in step 730. In step 740, the Telephony Server 308 transmits the call notification to the Signaling Server 312.

If the Telephony Server 308 receives a CANCEL (i.e., reject) instruction from the Signaling Server 312, it rejects/cancels the call, in step 750. If the Telephony Server 308 receives a TRANSFER instruction from the Signaling Server 312, it transfers the call to the specified number, in step 760. If the Telephony Server 308 receives a SIGNAL instruction from the Signaling Server 312, it places a call to the specified signaling number from the specified originating number, in step 770. If the SIGNAL specifies that the call needs to be cancelled after a specific time, the Telephony Server 308 starts a timer to reject/cancel the call after that time (and then reject/cancels the call at the appropriate time), in step 780. Otherwise, the Telephony Server 308 waits for a CANCEL instruction from the Signaling Server 312, as described above.

Figure 8:
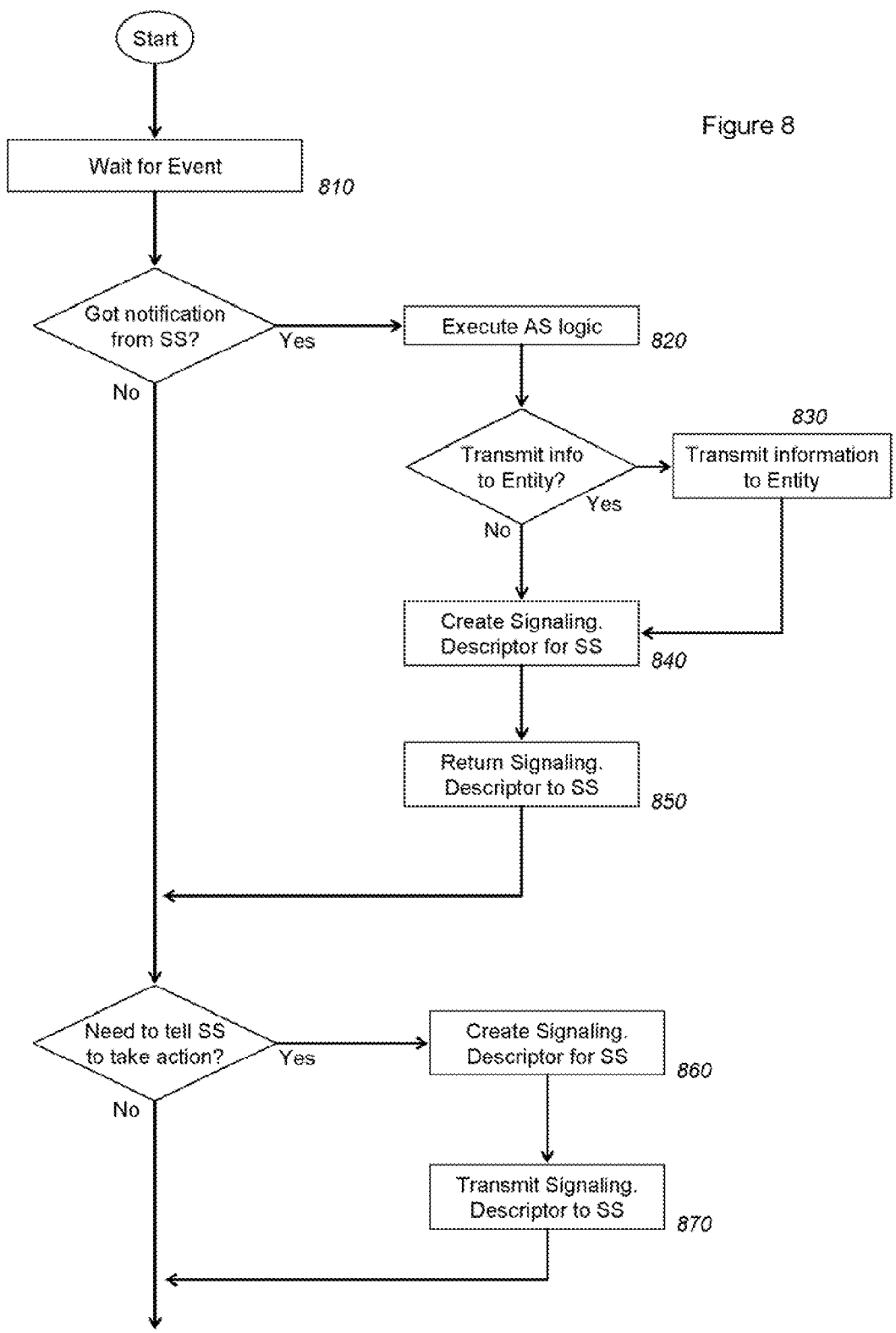
FIG. 8 illustrates an exemplary process for the operation of an exemplary Application Server, according to an embodiment of the present invention.
Figure 9:
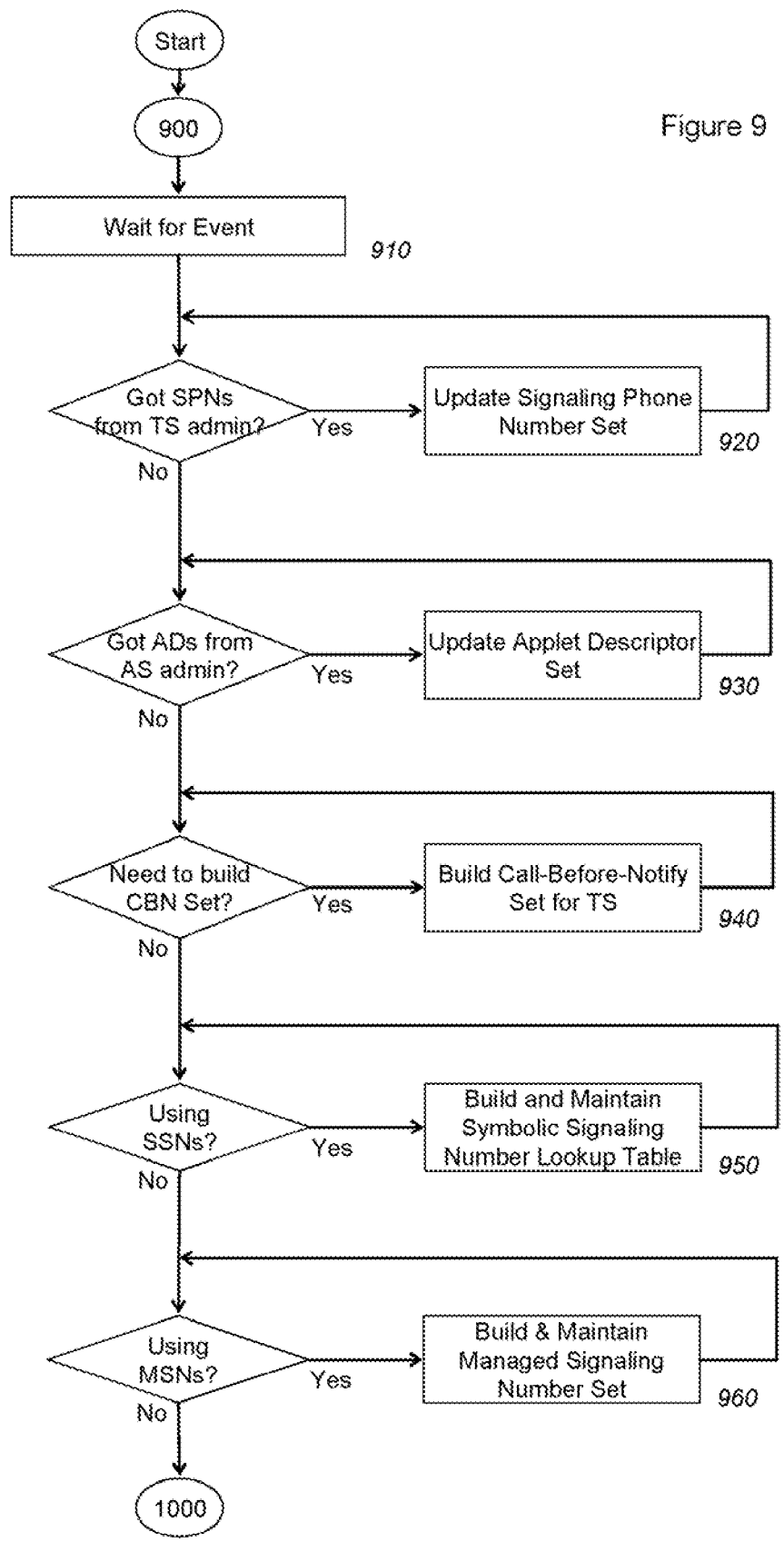
FIG. 9-12 illustrate an exemplary process for the operation of an exemplary Signaling Server, according to an embodiment of the present invention.
Figure 10:
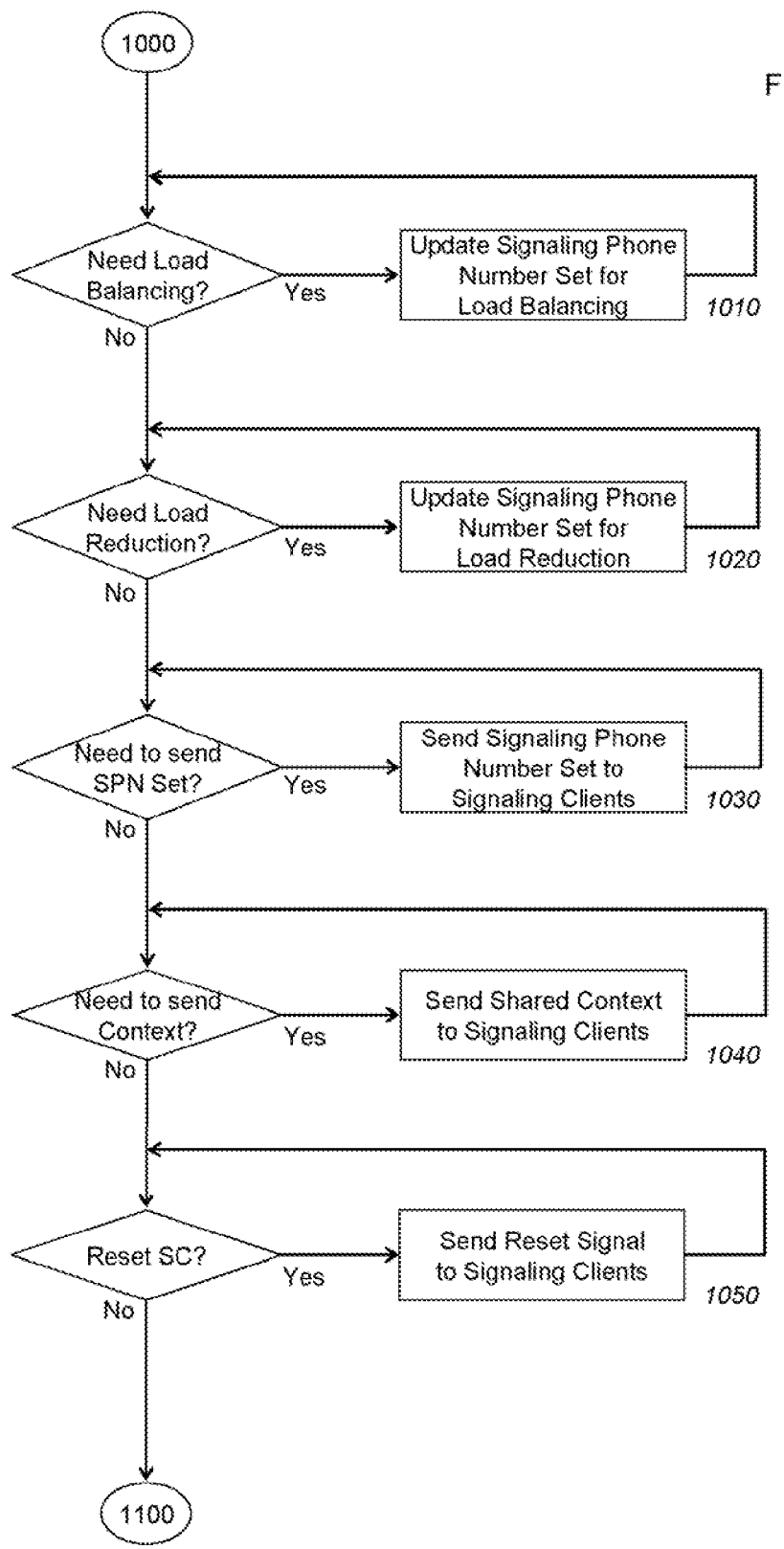
Figure 11:
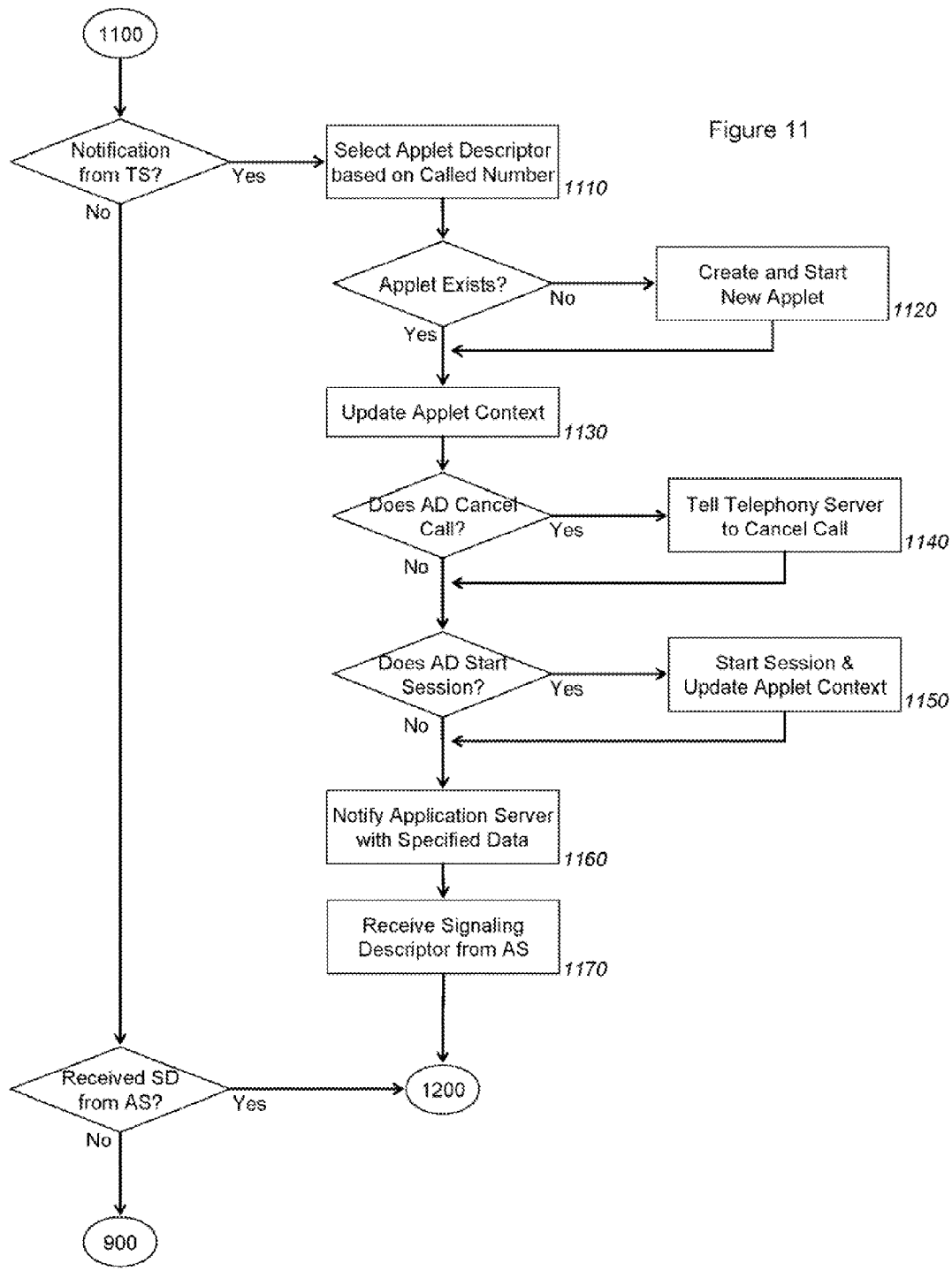
Figure 12:
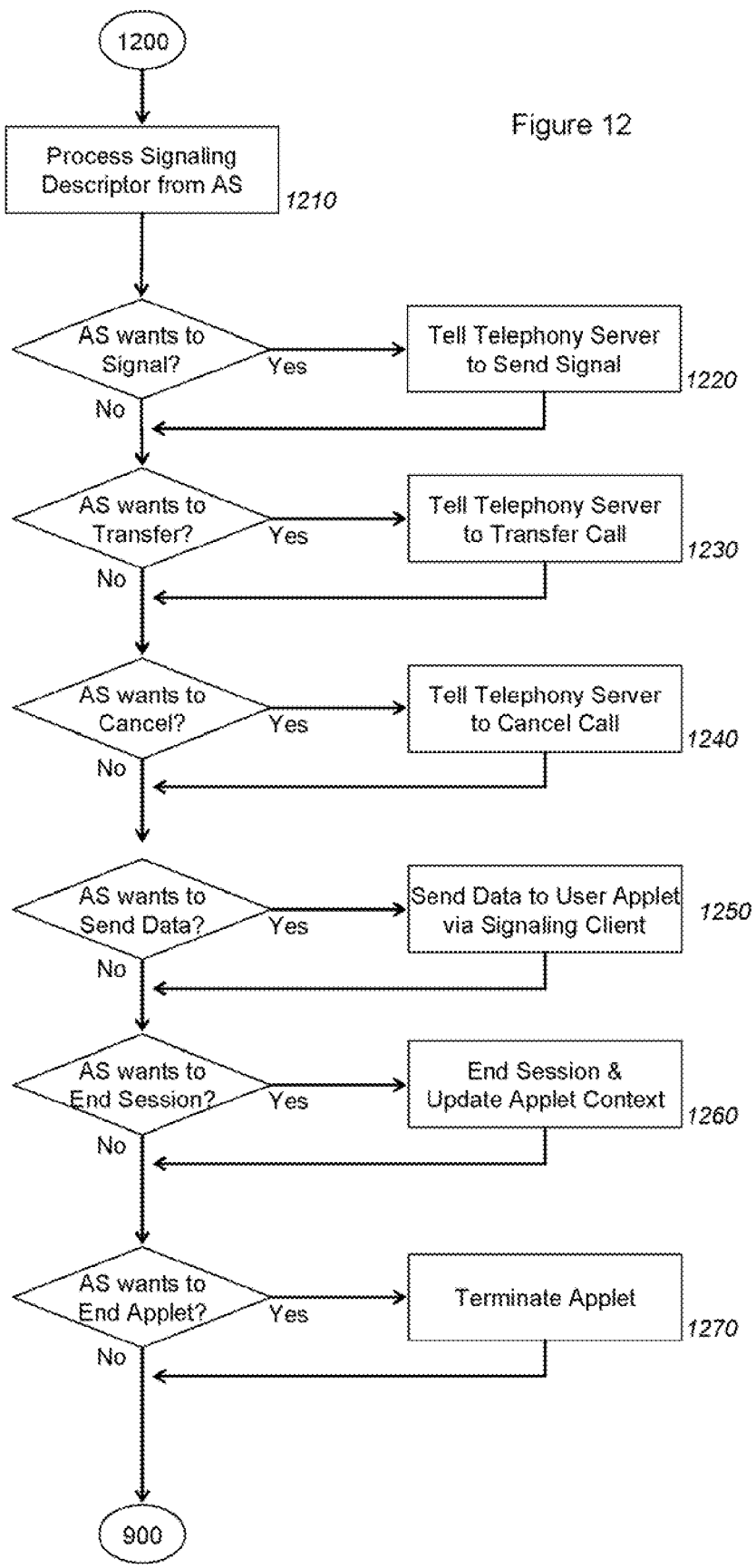

FIG. 8 illustrates an exemplary process flow showing the operation of an exemplary Application Server 310, according to an embodiment of the present invention. As shown in step 810, the Application Server 310 is configured to wait for events triggered by interaction either from the Signaling Server 312 or from internal Application Server 310 logic. When the Application Server 312 receives a notification from the Signaling Server 312, as specified in the Applet Descriptor, the Application Server 310 executes the Application Server-specific logic using data transferred with the notification, local data available to the Application Server 312, and/or data retrieved from one or more remote systems, in step 820. Optionally, in step 830, the Application Server 312 transmits information to any appropriate party (e.g., a Resource 116, another user, another Application Server 310, etc.) using communication channels available to it.

In step 840, the Application Server 310 determines the subsequent action for the Signaling Server 312, and creates an associated Signaling Descriptor, and in step 850, the Application Server 310 provides the Signaling Descriptor to the Signaling Server 312. The Application Server 310 may use the Signaling Descriptor to transmit data to the Telephony Device Applet 306, send content to a Resource 116, a user, Application Server or Web server, transfer the call to a different server, send instructions to the Signaling Server 312 to standby, or end the signaling interaction. The Application Server 310 may spontaneously have the Signaling Server 314 take some action by creating a Signaling Descriptor in step 860, and transmitting the Signaling Descriptor to the Signaling Server 314 in step 870.

FIGS. 9-12 illustrate an exemplary process flow showing the operation of an exemplary Signaling Server 312, according to an embodiment of the present invention. As shown in step 910, the Signaling Server 312 is configured to wait for events triggered by communications from the one or more Telephony Servers 308, one or more Application Servers 310, and/or its internal logic. In step 920, the Signaling Server 312 may periodically receive a signaling number set from the Telephony Server 308 or its administrator, and updates the existing signaling number set accordingly. The Signaling Server 312 may periodically receive Applet Descriptor information from the Application Server 310 or its administrator, and updates its Application Descriptor set accordingly, in step 930.

Optionally, the Signaling Server 312 may be configured to create a Cancel-Before-Notify set for each Telephony Server 308, using information from the Applet Descriptors in step 940. If the Signaling Server 312 is using symbolic signaling numbers, it may build and maintain a lookup table, in step 950. If the Signaling Server 312 is using a Managed Signaling Number method, it determines and maintains the signaling number set for use by the Signaling Clients 312, in step 960.

Optionally, the Signaling Server 312 may be configured to manipulate the signaling number set to do load balancing by distributing signaling load, in step 1010. Optionally, the Signaling Server 312 manipulates the signaling number set to do load reduction by distributing signaling load. (step 1020). If needed, the Signaling Server 312 transmits the signaling number set and related information to the Signaling Clients 304, in step 1030. Also, if needed, the Signaling Server 312 transmits shared context data to the Signaling Clients 304, as shown in step 1040. This may include the relevant signaling number set, Applet Descriptors and/or information related to the state of the Telephony Device Applet 306. If necessary, in step 1050, the Signaling Server 312 may send a reset signal to the one or more Signaling Clients 304, thereby placing the one or more Signaling Clients 304 in a state known to the Signaling Server 312 (i.e., a checkpoint).

Upon receipt by the Signaling Server 312 of a notification from a Telephony Server 308, the Signaling Server 312: determines the appropriate Applet Descriptor, based on the Called Number in the Telephony Server notification in step 1110; instantiates and starts an applet for this signaling interaction, unless one had already been instantiated, in step 1120; and updates the applet context and executes the specification provided in the Applet Descriptor in the context of the applet, in step 1130.

If the Applet Descriptor specifies canceling the call, the Signaling Server 312 directs the Telephony Server to cancel the call, in step 1140. If the Applet Descriptor specifies starting a session in the applet, the Signaling Server 312 starts a session and updates the applet's context, in step 1150.

Next, in step 1160, the Signaling Server 312 sends a notification to the designated Application Server 310 (as specified in the Applet Descriptor) along whit the appropriate data. In step 1170, the Signaling Server 312 receives a Signaling Descriptor in the response from the Application Sewer 310, such receipt may be the result of a spontaneous transmission from the Application Server 310. Next, in step 1210, the Signaling Server 312 processes the Signaling Descriptor received from the Application Server 310. If the Application Server 310 requests that a signal be sent, the Signaling Server 312 directs the appropriate Telephony Server 308 to send the signal, as shown in step 1220. Alternatively, if the Application Server 310 requests the call be transferred, the Signaling Server 312 directs the appropriate Telephony Server 308 to transfer the call, as shown in step 1230. Likewise, if the Application Server 310 requests cancellation of the call, the Signaling Server 312 directs the appropriate Telephony Server to cancel the call, in step 1240.

In step 1250, if the Application Server 310 wants to send data to the Telephony Device Applet 306, the Signaling Server 312 transmits the appropriate data to the Signaling Client 304. In step 1260, if the Application Server 310 wants to end the session for an applet, the Signaling Server 312 deans out the session state and updates the applet's context. Finally, in step 1270, if the Application Server 310 wants to end the signaling interaction, the Signaling Server 312 clears the state information and terminates the applet instance.

EXAMPLES

The following section provides a number of exemplary applications illustrating various uses of the Content Delivery System 100 and related methods, according to embodiments of the present invention, and in no way act as a limitation on the uses, functions, and/or operation of the content delivery systems and methods of the present invention.

Mobile Dial-A-Coupon:

A mobile phone user calls a specific signaling number provided by a store publicized in a local newspaper advertisement) to obtain a coupon (the desired task). The content delivery system of the present invention receives the connection request, extracts the connection request information, and rejects the request prior to completion of the connection, incurring no charge for the user. The content delivery system of the present invention sends an SMS message containing a coupon (i.e., the content) to the mobile phone (using the originating number). For users who have free incoming SMS, there is no cost to the subscriber.

Wireline Dial-A-Coupon:

A wireline user has his phone number as well as an e-mail address on record with a department store (shared context, established offline). The user calls a specific signaling number provided by the store (e.g., publicized in a TV advertisement) in order to obtain a coupon (the desired task). The content delivery system of the present invention receives the connection request, extracts the connection request information, and rejects the request, incurring no charge for the user. The content delivery system of the present invention looks up the e-mail address associated with the originating number, and sends an e-mail message containing a coupon to the user (i.e., delivery of the content).

Mobile Dial-for-Info:

A mobile phone user calls a signaling number provided by an information producer, wherein the signaling number encodes the information producer as well as the information that the user is seeking (the desired task). For example, Continental Airlines may ask users to call 1-600-CON-XXXX, where CON represents Continental Airlines and XXXX represents the flight number (prefixed by zeros for flight numbers of less than four digits) when they want up-to-date flight information for that flight. The content delivery system of the present invention receives the connection request, extracts the connection request information, and rejects the request, incurring no charge for the user. The content delivery system of the present invention identifies the desired task based on the signaling number, and sends an SMS message containing the requested flight information to the mobile phone (using the originating number). For users who have free incoming SMS, there is no cost to the subscriber.

Information into MobileApplication:

The content delivery system of the present invention maintains a list of places that it has weather information about. This data is mirrored in a mobile phone application (shared context, established offline). Via a user interface, the user picks one of these places and presses a button asking for a weather report. The mobile phone dials a specific signaling number corresponding to that place. The content delivery system of the present invention receives the connection request, extracts the connection request information, and rejects the request, incurring no charge for the user. The content delivery system of the present invention determines, based on shared context, the originating number and the signaling number, the location for which the weather update is requested (i.e., the desired task). The content delivery system of the present invention sends an SMS message with the appropriate weather information to the user's mobile phone (using the originating number). For users who have free incoming SMS, there is no cost to the subscriber. Similarly, the content delivery system of the present invention may maintain directory information for local businesses, yellow panes information, store hours, flight/bus/tram status etc.—in general any content that a user may desired. The users interact with a user interface to pick an item from the list, and using the above-described procedure, obtain the content he or she desires Interactive TV Show:

A TV show may invite users to vote for their favorite participant by displaying a list of signaling numbers on the screen, one per contestant. A wireline phone user may submit a connection request to the signaling number corresponding to the participant that he or she wishes to vote for. The content delivery system of the present invention receives the connection request, extracts the connection request information, and rejects the request, incurring no charge for the user. The content delivery system of the present invention determines the desired task based on the originating number and the signaling number and registers the vote (here, the delivery of the content comprises registration of the vote). In an alternate example, the mobile phone user may utilize a user interface for the TV show (shared context, established offline) to view the voting options. The user selects one of the voting options and interacts with the associated icon. The mobile phone dials a specific signaling number corresponding to the selected vote. The content delivery system of the present invention receives the connection request, extract the connection request information, and rejects the request, incurring no charge for the user. The content delivery system of the present invention determines the desired action the requested vote) and, based on shared context, the originating number and the signaling number, and registers the vote.

The foregoing description, corresponding, figures and examples are provided to illustrate an understanding of the principles of the present invention, and various modifications may be made by those skilled in the an without departing from the scope of the present invention described herein. Therefore, one skilled in the art will appreciate that the present invention can be practiced by other than the described embodiments, which are presented herein for purposes of illustration.

The invention claimed is:

1. A method comprising:
    receiving a connection request from a telephony device, wherein the connection request comprises connection request information;
    during an initiation phase of the connection request, extracting a signaling number from the connection request information;
    rejecting the connection request such that the connection is not completed;
    identifying content to be retrieved from an internet based on the extracted signaling number;
    retrieving the identified content from the internet based on the extracted signaling number; and
    delivering the retrieved content from the internet to the telephony device.

2. The method of claim 1, wherein the connection request information comprises an originating number identifying the telephony device.

3. The method of claim 2, wherein an extracted portion of the connection request information comprises the originating number, and a desired task is identified based at least in part on the originating number.

4. The method of claim 1, wherein the connection request information comprises a signaling number associated with a desired task.

5. The method of claim 4, wherein an extracted portion of the connection request information comprises the signaling number, and the desired task is identified based at least in part on the signaling number.

6. The method of claim 1, wherein the connection request information comprises an originating number identifying the telephony device and a signaling number associated with a desired task.

7. The method of claim 6, wherein an extracted portion of the connection request information comprises the originating number and the signaling number, and the desired task is identified based at least in part on the originating number and the signaling number.

8. The method of claim 7, wherein the desired task is identified based at least in part on an association between the originating number and the signaling number.

9. The method of claim 1, wherein delivering the retrieved content comprises transmitting the retrieved content to a user via an Interne-based communication or a telephony network-based communication.

10. The method of claim 1, wherein no fee is assessed to the telephony device during an initiation phase.

11. The method of claim 1, wherein retrieved content is delivered to a device other than the telephony device.

12. The method of claim 1, further comprising providing the telephony device with a signaling number via a graphical user interface.

13. The method of claim 1, further comprising:
    accessing a database that to stores an association between a desired task, an originating number, and the signaling number; and
    querying a database based on an originating number and the signaling number to identify the desired task.

14. The method of claim 1, further comprising:
    accessing a database that stores an association between a desired task and the signaling number; and
    querying a database based on the signaling number to identify the desired task.

15. A system comprising:
    a memory; and
    a processing device communicably coupled to the memory, the processing device to:
    receive a connection request comprising connection request information from a telephony device,
    during an initiation phase of the connection request, extract a signaling number from the connection request information,
    reject the connection request such that the connection is not completed,
    identify content to be retrieved from an internet based on the extracted signaling number,
    retrieve the identified content from the internet based on the extracted signaling number, and
    deliver the retrieved content from the internet to the telephony device.

16. The system of claim 15, further to:
    store information related to a plurality of desired tasks.

17. The system of claim 15, wherein the connection request information comprises an originating number identifying the telephony device that transmitted the connection request, and wherein a database stores an association between an originating number and a desired task.

18. The system of claim 15, wherein the connection request information comprises a signaling number and wherein a database stores an association between the signaling number and a desired task.

19. The system of claim 15, wherein the connection request information comprises an originating number identifying the telephony device that transmitted the connection request and a signaling number, and wherein a database stores an association between the originating number, the signaling number, and a desired task.

20. The system of claim 15, further comprising:
    a resource that provides the retrieved content associated with an identified desired task.

21. The system of claim 15, wherein an extracted portion of the connection request information comprises an originating number identifying the telephony device that transmitted the connection request, further to:
    identify a desired task based at least in part on the originating number.

22. The system of claim 15, wherein an extracted portion of the connection request information comprises a signaling number associated with a desired task, further to:
    identify the desired task based at least in part on the signaling number.

23. The system of claim 15, wherein an extracted portion of the connection request information comprises an originating number identifying the telephony device that transmitted the connection request and a signaling number associated with a desired task, further to:
identify the desired task based at least in part on the originating number and the signaling number.

24. The system of claim 15, further to:
deliver the retrieved content associated with an identified desired task to the telephony device that transmitted the connection request.

25. The system of claim 15, further to:
deliver the retrieved content associated with an identified desired task to a device other than the telephony device.

26. The system of claim 15, wherein no fee is assessed to the telephony device during an initiation phase.

27. The system of claim 15, further to:
provide the telephony device with a signaling number via a graphical user interface.

* * * * *